(12) United States Patent
Rockey et al.

(10) Patent No.: US 7,712,048 B2
(45) Date of Patent: May 4, 2010

(54) TASK-SENSITIVE METHODS AND SYSTEMS FOR DISPLAYING COMMAND SETS

(75) Inventors: Eric S. Rockey, Seattle, WA (US);
Shannon P. Talbott, Kirkland, WA (US);
Gavin M. Kelly, Seattle, WA (US);
Nancy E. Jacobs, Redmond, WA (US);
Michael J. Hopcroft, Kirkland, WA (US); Daniel J. Westreich, Seattle, WA (US); Jonathan D. Perlow, Seattle, WA (US); Paul R. Erickson, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 831 days.

(21) Appl. No.: 10/897,647

(22) Filed: Jul. 23, 2004

(65) Prior Publication Data

US 2005/0005248 A1   Jan. 6, 2005

Related U.S. Application Data

(62) Division of application No. 09/599,086, filed on Jun. 21, 2000.

(51) Int. Cl.
*G06F 3/048* (2006.01)

(52) U.S. Cl. .................. 715/811; 715/779; 715/826

(58) Field of Classification Search ........... 715/779, 715/811, 817, 825, 835, 810, 765
See application file for complete search history.

(56) References Cited

U.S. PATENT DOCUMENTS

| 2,804,878 | A | 9/1957 | Fishwood et al. |
| 3,091,077 | A | 5/1963 | Erickson et al. |
| 3,104,520 | A | 9/1963 | Cazier et al. |
| 3,195,805 | A | 7/1965 | Cholvin et al. |
| 3,196,606 | A | 7/1965 | Cholvin et al. |
| 3,812,942 | A | 5/1974 | Espenschied et al. |
| 3,874,828 | A | 4/1975 | Herschler et al. |
| 3,961,748 | A | 6/1976 | McNabney |
| 4,005,578 | A | 2/1977 | McInerney |
| 4,005,579 | A | 2/1977 | Lloyd |
| 4,060,340 | A | 11/1977 | Yanik et al. |

(Continued)

FOREIGN PATENT DOCUMENTS

EP   0 841 615 A2   5/1998

(Continued)

OTHER PUBLICATIONS

"Enter Key", Retrieved from the Internet at http://systems.webopedia.com/TERM/Enter_key.html on Dec. 20, 2006.

(Continued)

*Primary Examiner*—Dennis Bonshock
(74) *Attorney, Agent, or Firm*—Merchant & Gould P.C.

(57) ABSTRACT

Methods and systems present commands to a user within a software application program by determining the user's context within the application program and automatically presenting in a user interface commands that pertain to the user's current context. When the user's context changes, the context-sensitive commands are automatically removed from the user interface. In one implementation context blocks and context panes are employed to present the commands.

12 Claims, 13 Drawing Sheets

U.S. PATENT DOCUMENTS

| | | |
|---|---|---|
| 4,089,623 A | 5/1978 | Hofmann, Jr. |
| 4,201,978 A | 5/1980 | Nally |
| 4,256,019 A | 3/1981 | Braddick |
| 4,362,475 A | 12/1982 | Seitz |
| 4,391,184 A | 7/1983 | Yamane et al. |
| 4,396,345 A | 8/1983 | Hutchinson |
| 4,498,147 A | 2/1985 | Agnew et al. |
| 4,514,800 A | 4/1985 | Gruner et al. |
| 4,514,985 A | 5/1985 | Cadeddu |
| 4,564,752 A | 1/1986 | Lepic et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |
| 4,933,880 A | 6/1990 | Borgendale et al. |
| 4,962,475 A | 10/1990 | Hernandez et al. |
| 5,025,484 A | 6/1991 | Yamanari et al. |
| 5,072,412 A | 12/1991 | Henderson, Jr. et al. |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,257,646 A | 11/1993 | Meyer |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,388,967 A | 2/1995 | Firnhaber et al. |
| 5,388,968 A | 2/1995 | Wood et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,456,582 A | 10/1995 | Firnhaber et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,540,558 A | 7/1996 | Harden et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,556,271 A | 9/1996 | Zuercher et al. |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,613,837 A | 3/1997 | Konishi et al. |
| 5,625,783 A | 4/1997 | Ezekiel et al. |
| 5,627,979 A | 5/1997 | Chang et al. |
| 5,630,126 A | 5/1997 | Redpath |
| 5,630,706 A | 5/1997 | Yang |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,655,887 A | 8/1997 | Chou |
| 5,659,729 A | 8/1997 | Nielsen |
| 5,664,178 A | 9/1997 | Sinofsky |
| 5,664,938 A | 9/1997 | Yang |
| 5,668,966 A | 9/1997 | Ono et al. |
| 5,669,005 A | 9/1997 | Curbow et al. |
| 5,681,151 A | 10/1997 | Wood |
| 5,682,536 A | 10/1997 | Atkinson et al. |
| 5,689,667 A * | 11/1997 | Kurtenbach .................. 715/810 |
| 5,689,703 A | 11/1997 | Atkinson et al. |
| 5,692,540 A | 12/1997 | Huang |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,785,081 A | 7/1998 | Krawczyk et al. |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,803,715 A | 9/1998 | Kitchener |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |

| Patent | Date | Inventor |
|---|---|---|
| 5,875,815 A | 3/1999 | Ungerecht et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,928,363 A | 7/1999 | Ruvolo |
| 5,929,858 A | 7/1999 | Shibata et al. |
| RE36,281 E | 8/1999 | Zuercher et al. |
| 5,940,075 A | 8/1999 | Mutschler, III et al. |
| 5,947,711 A | 9/1999 | Myers et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni et al. |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A * | 12/1999 | Gayraud et al. ............ 715/709 |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,708 A | 7/2000 | Burch et al. |
| 6,091,417 A | 7/2000 | Lefkowitz |
| 6,094,657 A | 7/2000 | Hailpern et al. |
| 6,097,382 A | 8/2000 | Rosen et al. |
| 6,098,081 A | 8/2000 | Heidorn et al. |
| 6,108,637 A | 8/2000 | Blumenau |
| 6,108,783 A | 8/2000 | Krawczyk et al. |
| 6,115,646 A | 9/2000 | Fiszman et al. |
| 6,121,965 A * | 9/2000 | Kenney et al. ............ 715/810 |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,167,523 A | 12/2000 | Strong |
| 6,182,094 B1 | 1/2001 | Humpleman et al. |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,698 B1 | 4/2001 | Iannucci et al. |
| 6,225,996 B1 | 5/2001 | Gibb et al. |
| 6,235,027 B1 | 5/2001 | Herzon |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,272,506 B1 | 8/2001 | Bell |
| 6,275,227 B1 | 8/2001 | DeStefano |
| 6,275,599 B1 | 8/2001 | Adler et al. |
| 6,279,042 B1 | 8/2001 | Ouchi |
| 6,281,896 B1 | 8/2001 | Alimpich et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |
| 6,308,273 B1 | 10/2001 | Goertzel et al. |
| 6,311,271 B1 | 10/2001 | Gennaro et al. |
| 6,314,415 B1 | 11/2001 | Mukherjee |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,336,797 B1 | 1/2002 | Kazakis et al. |
| 6,342,907 B1 | 1/2002 | Petty et al. |
| 6,343,149 B1 | 1/2002 | Motoiwa |
| 6,343,302 B1 | 1/2002 | Graham |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,351,574 B1 | 2/2002 | Yair et al. |
| 6,353,851 B1 | 3/2002 | Anupam et al. |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette et al. |
| 6,393,456 B1 | 5/2002 | Ambler et al. |
| 6,396,488 B1 | 5/2002 | Simmons et al. |
| 6,405,221 B1 | 6/2002 | Levine et al. |
| 6,408,311 B1 | 6/2002 | Baisley et al. |
| 6,414,700 B1 * | 7/2002 | Kurtenbach et al. ......... 715/810 |
| 6,421,070 B1 | 7/2002 | Ramos et al. |
| 6,421,656 B1 | 7/2002 | Cheng et al. |
| 6,425,125 B1 | 7/2002 | Fries et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,006 B1 | 12/2002 | Gourdol et al. |

| | | | | | |
|---|---|---|---|---|---|
| 6,493,702 B1 | 12/2002 | Adar et al. | 6,754,874 B1 | 6/2004 | Richman |
| 6,501,864 B1 | 12/2002 | Eguchi et al. | 6,757,826 B1 | 6/2004 | Paltenghe |
| 6,502,101 B1 | 12/2002 | Verprauskus et al. | 6,757,868 B1 | 6/2004 | Glaser et al. |
| 6,502,103 B1 | 12/2002 | Frey et al. | 6,760,723 B2 | 7/2004 | Oshinsky et al. |
| 6,505,230 B1 | 1/2003 | Mohan et al. | 6,763,343 B1 | 7/2004 | Brooke et al. |
| 6,505,300 B2 | 1/2003 | Chan et al. | 6,772,139 B1 | 8/2004 | Smith, III |
| 6,507,856 B1 | 1/2003 | Chen et al. | 6,772,165 B2 | 8/2004 | O'Carroll |
| 6,516,322 B1 | 2/2003 | Meredith | 6,774,926 B1 | 8/2004 | Ellis et al. |
| 6,519,617 B1 | 2/2003 | Wanderski et al. | 6,779,154 B1 | 8/2004 | Nussbaum et al. |
| RE38,070 E | 4/2003 | Spies et al. | 6,781,609 B1 | 8/2004 | Barker et al. |
| 6,546,546 B1 | 4/2003 | Van Doorn | 6,782,144 B2 | 8/2004 | Bellavita et al. |
| 6,549,221 B1 | 4/2003 | Brown et al. | 6,799,299 B1 | 9/2004 | Li et al. |
| 6,549,878 B1 | 4/2003 | Lowry et al. | 6,801,929 B1 * | 10/2004 | Donoho et al. ............. 709/204 |
| 6,549,922 B1 | 4/2003 | Srivastava et al. | 6,816,849 B1 | 11/2004 | Halt, Jr. |
| 6,553,402 B1 | 4/2003 | Makarios et al. | 6,845,380 B2 | 1/2005 | Su et al. |
| 6,560,616 B1 | 5/2003 | Garber | 6,845,499 B2 | 1/2005 | Srivastava et al. |
| 6,560,620 B1 | 5/2003 | Ching | 6,847,387 B2 * | 1/2005 | Roth ........................ 715/811 |
| 6,560,640 B2 | 5/2003 | Smethers | 6,848,078 B1 | 1/2005 | Birsan et al. |
| 6,563,514 B1 | 5/2003 | Samar | 6,871,220 B1 | 3/2005 | Rajan et al. |
| 6,571,253 B1 | 5/2003 | Thompson et al. | 6,874,130 B1 | 3/2005 | Baweja, et al. |
| 6,578,144 B1 | 6/2003 | Gennaro et al. | 6,876,996 B2 | 4/2005 | Czajkowski et al. |
| 6,581,061 B2 | 6/2003 | Graham | 6,889,359 B1 | 5/2005 | Conner et al. |
| 6,584,469 B1 | 6/2003 | Chiang et al. | 6,901,403 B1 | 5/2005 | Bata et al. |
| 6,584,548 B1 | 6/2003 | Bourne et al. | 6,915,454 B1 | 7/2005 | Moore et al. |
| 6,585,778 B1 | 7/2003 | Hind et al. | 6,931,532 B1 | 8/2005 | Davis et al. |
| 6,589,290 B1 | 7/2003 | Maxwell et al. | 6,941,510 B1 | 9/2005 | Ozzie et al. |
| 6,594,686 B1 | 7/2003 | Edwards et al. | 6,941,511 B1 | 9/2005 | Hind et al. |
| 6,598,219 B1 | 7/2003 | Lau | 6,941,521 B2 | 9/2005 | Lin et al. |
| 6,603,489 B1 | 8/2003 | Edlund et al. | 6,948,129 B1 | 9/2005 | Loghmani |
| 6,604,099 B1 | 8/2003 | Chung et al. | 6,948,133 B2 | 9/2005 | Haley |
| 6,606,606 B2 | 8/2003 | Starr | 6,948,135 B1 | 9/2005 | Ruthfield et al. |
| 6,609,200 B2 | 8/2003 | Anderson et al. | 6,950,980 B1 | 9/2005 | Malcolm |
| 6,611,822 B1 | 8/2003 | Beams et al. | 6,961,897 B1 | 11/2005 | Peel, Jr. et al. |
| 6,611,840 B1 | 8/2003 | Baer et al. | 6,963,875 B2 | 11/2005 | Moore et al. |
| 6,611,843 B1 | 8/2003 | Jacobs | 6,968,503 B1 | 11/2005 | Chang et al. |
| 6,643,684 B1 | 8/2003 | Malkin et al. | 6,968,505 B2 | 11/2005 | Stoll et al. |
| 6,613,098 B1 | 9/2003 | Sorge et al. | 6,993,714 B2 | 1/2006 | Kaler et al. |
| 6,615,276 B1 | 9/2003 | Mastrianni et al. | 6,996,776 B1 | 2/2006 | Makely et al. |
| 6,629,109 B1 | 9/2003 | Koshisaka | 6,996,781 B1 | 2/2006 | Myers et al. |
| 6,631,357 B1 | 10/2003 | Perkowski | 7,000,179 B2 | 2/2006 | Yankovich et al. |
| 6,631,379 B2 | 10/2003 | Cox | 7,002,560 B2 | 2/2006 | Graham |
| 6,631,497 B1 | 10/2003 | Jamshidi et al. | 7,003,722 B2 | 2/2006 | Rothchiller et al. |
| 6,631,519 B1 | 10/2003 | Nicholson et al. | 7,010,580 B1 | 3/2006 | Fu et al. |
| 6,632,251 B1 | 10/2003 | Rutten et al. | 7,020,869 B2 | 3/2006 | Abriari et al. |
| 6,635,089 B1 | 10/2003 | Burkett et al. | 7,024,417 B1 | 4/2006 | Russakovsky et al. |
| 6,636,845 B2 | 10/2003 | Chau et al. | 7,032,170 B2 | 4/2006 | Poulose |
| 6,643,633 B2 | 11/2003 | Chau et al. | 7,036,072 B1 | 4/2006 | Sulistio et al. |
| 6,643,652 B2 | 11/2003 | Helgeson et al. | 7,039,875 B2 | 5/2006 | Khalfay et al. |
| 6,651,217 B1 | 11/2003 | Kennedy et al. | 7,051,273 B1 | 5/2006 | Holt et al. |
| 6,654,737 B1 | 11/2003 | Nunez | 7,058,663 B2 | 6/2006 | Johnston et al. |
| 6,654,932 B1 | 11/2003 | Bahrs et al. | 7,062,764 B2 | 6/2006 | Cohen et al. |
| 6,658,417 B1 | 12/2003 | Stakutis et al. | 7,065,493 B1 | 6/2006 | Homsi |
| 6,658,622 B1 | 12/2003 | Aiken et al. | 7,080,083 B2 | 7/2006 | Kim |
| 6,661,920 B1 | 12/2003 | Skinner | 7,080,325 B2 | 7/2006 | Treibach-Heck et al. |
| 6,668,369 B1 | 12/2003 | Krebs | 7,086,009 B2 | 8/2006 | Resnick et al. |
| 6,671,805 B1 | 12/2003 | Brown et al. | 7,086,042 B2 | 8/2006 | Abe et al. |
| 6,675,202 B1 | 1/2004 | Perttunen | 7,088,374 B2 | 8/2006 | David et al. |
| 6,678,717 B1 | 1/2004 | Schneider | 7,100,147 B2 | 8/2006 | Miller et al. |
| 6,681,370 B2 | 1/2004 | Gounares et al. | 7,103,611 B2 | 9/2006 | Murthy et al. |
| 6,691,230 B1 | 2/2004 | Bardon | 7,106,888 B1 | 9/2006 | Silverbrook et al. |
| 6,691,281 B1 | 2/2004 | Sorge et al. | 7,107,282 B1 | 9/2006 | Yalmanchi |
| 6,697,944 B1 | 2/2004 | Jones et al. | 7,107,521 B2 | 9/2006 | Santos |
| 6,701,434 B1 | 3/2004 | Rohatgi | 7,146,564 B2 | 12/2006 | Kim et al. |
| 6,701,486 B1 | 3/2004 | Weber et al. | 7,152,205 B2 | 12/2006 | Day et al. |
| 6,704,906 B1 | 3/2004 | Yankovich et al. | 7,168,035 B1 | 1/2007 | Bell et al. |
| 6,711,679 B1 | 3/2004 | Guski et al. | 7,178,166 B1 | 2/2007 | Taylor et al. |
| 6,720,985 B1 | 4/2004 | Silverbrook et al. | 7,190,376 B1 | 3/2007 | Tonisson |
| 6,725,426 B1 | 4/2004 | Pavlov | 7,191,394 B1 | 3/2007 | Ardeleanu et al. |
| 6,728,755 B1 | 4/2004 | de Ment | 7,213,200 B2 | 5/2007 | Abe et al. |
| 6,735,721 B1 | 5/2004 | Morrow et al. | 7,236,982 B2 | 6/2007 | Zlatanov et al. |
| 6,745,367 B1 | 6/2004 | Bates et al. | 7,272,789 B2 | 9/2007 | O'Brien |
| 6,748,385 B1 | 6/2004 | Rodkin et al. | 7,281,018 B1 | 10/2007 | Begun et al. |
| 6,751,777 B2 | 6/2004 | Bates et al. | 7,296,017 B2 | 11/2007 | Larcheveque et al. |

| | | | | | | |
|---|---|---|---|---|---|---|
| 7,313,758 | B2 | 12/2007 | Kozlov | 2003/0051243 A1 | 3/2003 | Lemmons et al. |
| 7,316,003 | B1 | 1/2008 | Dulepet et al. | 2003/0055811 A1 | 3/2003 | Stork et al. |
| 7,318,237 | B2 | 1/2008 | Moriconi et al. | 2003/0055828 A1 | 3/2003 | Koch et al. |
| 7,334,178 | B1 | 2/2008 | Stanciu et al. | 2003/0056198 A1 | 3/2003 | Al-Azzawe |
| 2001/0007109 | A1 | 7/2001 | Lange | 2003/0061386 A1 | 3/2003 | Brown |
| 2001/0022592 | A1 | 9/2001 | Alimpich et al. | 2003/0061567 A1 | 3/2003 | Brown et al. |
| 2001/0024195 | A1 | 9/2001 | Hayakawa | 2003/0074279 A1 | 4/2003 | Viswanath et al. |
| 2001/0037345 | A1 | 11/2001 | Kiernan et al. | 2003/0084424 A1 | 5/2003 | Reddy et al. |
| 2001/0054004 | A1 | 12/2001 | Powers | 2003/0093755 A1 | 5/2003 | O'Carroll |
| 2001/0056429 | A1 | 12/2001 | Moore et al. | 2003/0110443 A1 | 6/2003 | Yankovich et al. |
| 2001/0056460 | A1 | 12/2001 | Sahota | 2003/0120578 A1 | 6/2003 | Newman |
| 2002/0010700 | A1 | 1/2002 | Wotring | 2003/0120651 A1 | 6/2003 | Bernstein et al. |
| 2002/0010743 | A1 | 1/2002 | Ryan et al. | 2003/0120659 A1 | 6/2003 | Sridhar |
| 2002/0010746 | A1 | 1/2002 | Jilk et al. | 2003/0120671 A1 | 6/2003 | Kim et al. |
| 2002/0013788 | A1 | 1/2002 | Pennell et al. | 2003/0120686 A1 | 6/2003 | Kim et al. |
| 2002/0019941 | A1 | 2/2002 | Chan et al. | 2003/0126555 A1 | 7/2003 | Aggarwal et al. |
| 2002/0023113 | A1 | 2/2002 | Hsing et al. | 2003/0128196 A1 | 7/2003 | Lapstun et al. |
| 2002/0026441 | A1 | 2/2002 | Kutay et al. | 2003/0135825 A1 | 7/2003 | Gertner et al. |
| 2002/0026461 | A1 | 2/2002 | Kutay et al. | 2003/0140132 A1 | 7/2003 | Champagne et al. |
| 2002/0032590 | A1 | 3/2002 | Anand et al. | 2003/0158897 A1 | 8/2003 | Ben-Natan et al. |
| 2002/0032692 | A1 | 3/2002 | Suzuki et al. | 2003/0163285 A1 | 8/2003 | Nakamura et al. |
| 2002/0032706 | A1 | 3/2002 | Perla et al. | 2003/0167277 A1 | 9/2003 | Hejlsberg et al. |
| 2002/0032768 | A1 | 3/2002 | Voskuil | 2003/0182268 A1 | 9/2003 | Lal |
| 2002/0035579 | A1 | 3/2002 | Wang et al. | 2003/0182327 A1 | 9/2003 | Ramanujam et al. |
| 2002/0035581 | A1 | 3/2002 | Reynar et al. | 2003/0187756 A1 | 10/2003 | Klivington et al. |
| 2002/0040469 | A1 | 4/2002 | Pramberger | 2003/0187930 A1 | 10/2003 | Ghaffar et al. |
| 2002/0049790 | A1 | 4/2002 | Ricker et al. | 2003/0188260 A1 | 10/2003 | Jensen et al. |
| 2002/0054126 | A1 | 5/2002 | Gamon | 2003/0189593 A1 | 10/2003 | Yarvin |
| 2002/0054128 | A1 | 5/2002 | Lau et al. | 2003/0192008 A1 | 10/2003 | Lee |
| 2002/0057297 | A1 | 5/2002 | Grimes et al. | 2003/0200506 A1 | 10/2003 | Abe et al. |
| 2002/0065798 | A1 | 5/2002 | Bostleman et al. | 2003/0204511 A1 | 10/2003 | Brundage |
| 2002/0065847 | A1 | 5/2002 | Furukawa et al. | 2003/0204814 A1 | 10/2003 | Elo et al. |
| 2002/0070973 | A1 | 6/2002 | Croley | 2003/0205615 A1 | 11/2003 | Marappan |
| 2002/0078074 | A1 | 6/2002 | Cho et al. | 2003/0212664 A1 | 11/2003 | Breining et al. |
| 2002/0078103 | A1 | 6/2002 | Gorman et al. | 2003/0212902 A1 | 11/2003 | van der Made |
| 2002/0083318 | A1 | 6/2002 | Larose | 2003/0217053 A1 | 11/2003 | Bachman et al. |
| 2002/0099952 | A1 | 7/2002 | Lambert et al. | 2003/0220930 A1 | 11/2003 | Milleker et al. |
| 2002/0100027 | A1 | 7/2002 | Binding et al. | 2003/0225469 A1 | 12/2003 | DeRemer et al. |
| 2002/0112224 | A1 | 8/2002 | Cox | 2003/0225768 A1 | 12/2003 | Chaudhuri |
| 2002/0129056 | A1 | 9/2002 | Conant | 2003/0225829 A1 | 12/2003 | Pena et al. |
| 2002/0133484 | A1 | 9/2002 | Chau et al. | 2003/0226111 A1 | 12/2003 | Wirts et al. |
| 2002/0152222 | A1 | 10/2002 | Holbrook | 2003/0226132 A1 | 12/2003 | Tondreau et al. |
| 2002/0152244 | A1 | 10/2002 | Dean et al. | 2003/0233374 A1 | 12/2003 | Spinola et al. |
| 2002/0156772 | A1 | 10/2002 | Chau et al. | 2003/0233644 A1 | 12/2003 | Cohen et al. |
| 2002/0156846 | A1 | 10/2002 | Rawat et al. | 2003/0236859 A1 | 12/2003 | Vaschillo et al. |
| 2002/0156929 | A1 | 10/2002 | Hekmatpour | 2003/0236903 A1 | 12/2003 | Piotrowski |
| 2002/0169752 | A1 | 11/2002 | Kusama et al. | 2003/0237046 A1 | 12/2003 | Parker et al. |
| 2002/0169789 | A1 | 11/2002 | Kutay et al. | 2003/0237047 A1 | 12/2003 | Borson |
| 2002/0174147 | A1 | 11/2002 | Wang et al. | 2004/0002939 A1 | 1/2004 | Arora |
| 2002/0174417 | A1 | 11/2002 | Sijacic et al. | 2004/0003031 A1 | 1/2004 | Brown et al. |
| 2002/0178380 | A1 | 11/2002 | Wolf et al. | 2004/0003353 A1 | 1/2004 | Rivera et al. |
| 2002/0184219 | A1 | 12/2002 | Preisig et al. | 2004/0003389 A1 | 1/2004 | Reynar et al. |
| 2002/0188597 | A1 | 12/2002 | Kern et al. | 2004/0010752 A1 | 1/2004 | Chan et al. |
| 2002/0188613 | A1 | 12/2002 | Chakraborty et al. | 2004/0024842 A1 | 2/2004 | Witt |
| 2002/0194219 | A1 | 12/2002 | Bradley et al. | 2004/0030991 A1 | 2/2004 | Hepworth et al. |
| 2002/0196281 | A1 | 12/2002 | Audleman et al. | 2004/0039990 A1 | 2/2004 | Bakar et al. |
| 2002/0196288 | A1 | 12/2002 | Emrani | 2004/0039993 A1 | 2/2004 | Kougiouris et al. |
| 2002/0198891 | A1 | 12/2002 | Li | 2004/0044961 A1 | 3/2004 | Pesenson |
| 2002/0198935 | A1 | 12/2002 | Crandall, Sr. et al. | 2004/0044965 A1 | 3/2004 | Toyama et al. |
| 2003/0004951 | A1 | 1/2003 | Chokshi | 2004/0054966 A1 | 3/2004 | Busch et al. |
| 2003/0007000 | A1 | 1/2003 | Carlson et al. | 2004/0059754 A1 | 3/2004 | Barghout et al. |
| 2003/0014397 | A1 | 1/2003 | Chau et al. | 2004/0073565 A1 | 4/2004 | Kaufman et al. |
| 2003/0018668 | A1 | 1/2003 | Britton et al. | 2004/0073868 A1 | 4/2004 | Easter et al. |
| 2003/0020746 | A1 | 1/2003 | Chen et al. | 2004/0078756 A1 | 4/2004 | Napper et al. |
| 2003/0023641 | A1 | 1/2003 | Gorman et al. | 2004/0083426 A1 | 4/2004 | Sahu |
| 2003/0025732 | A1 | 2/2003 | Prichard | 2004/0088647 A1 | 5/2004 | Miller et al. |
| 2003/0026507 | A1 | 2/2003 | Zlotnick | 2004/0088652 A1 | 5/2004 | Abe et al. |
| 2003/0028550 | A1 | 2/2003 | Lee et al. | 2004/0093596 A1 | 5/2004 | Koyano |
| 2003/0033037 | A1 | 2/2003 | Yuen et al. | 2004/0107367 A1 | 6/2004 | Kisters |
| 2003/0037303 | A1 | 2/2003 | Bodlaender | 2004/0117769 A1 | 6/2004 | Lauzon et al. |
| 2003/0043986 | A1 | 3/2003 | Creamer | 2004/0123277 A1 | 6/2004 | Schrader et al. |
| 2003/0046665 | A1 | 3/2003 | Ilin | 2004/0146199 A1 | 7/2004 | Berkner et al. |
| 2003/0048301 | A1 | 3/2003 | Menninger | 2004/0163041 A1 | 8/2004 | Engel |

| | | |
|---|---|---|
| 2004/0172442 A1 | 9/2004 | Ripley |
| 2004/0181711 A1 | 9/2004 | Johnson et al. |
| 2004/0186762 A1 | 9/2004 | Beaven et al. |
| 2004/0189716 A1 | 9/2004 | Paoli et al. |
| 2004/0194035 A1 | 9/2004 | Chakraborty |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler |
| 2004/0205592 A1 | 10/2004 | Huang |
| 2004/0205605 A1 | 10/2004 | Adler et al. |
| 2004/0205653 A1 | 10/2004 | Hadfield et al. |
| 2004/0205671 A1 | 10/2004 | Sukehiro et al. |
| 2004/0210599 A1 | 10/2004 | Friedman et al. |
| 2004/0221238 A1 | 11/2004 | Cifra et al. |
| 2004/0221245 A1 | 11/2004 | Chickles et al. |
| 2004/0237030 A1 | 11/2004 | Malkin |
| 2004/0261019 A1 | 12/2004 | Imamura et al. |
| 2004/0268229 A1 | 12/2004 | Paoli et al. |
| 2004/0268259 A1 | 12/2004 | Rockey et al. |
| 2004/0268260 A1 | 12/2004 | Rockey et al. |
| 2005/0004893 A1 | 1/2005 | Sangroniz |
| 2005/0005248 A1 | 1/2005 | Rockey et al. |
| 2005/0015279 A1 | 1/2005 | Rucker |
| 2005/0015732 A1 | 1/2005 | Vedula et al. |
| 2005/0022115 A1 | 1/2005 | Baumgartner et al. |
| 2005/0027757 A1 | 2/2005 | Kiessig et al. |
| 2005/0033728 A1 | 2/2005 | James |
| 2005/0038711 A1 | 2/2005 | Marlelo |
| 2005/0055627 A1 | 3/2005 | Lloyd et al. |
| 2005/0060324 A1 | 3/2005 | Johnson et al. |
| 2005/0060721 A1 | 3/2005 | Choudhary et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076049 A1 | 4/2005 | Qubti et al. |
| 2005/0091285 A1 | 4/2005 | Krishnan et al. |
| 2005/0091305 A1 | 4/2005 | Lange et al. |
| 2005/0102370 A1 | 5/2005 | Lin et al. |
| 2005/0102612 A1 | 5/2005 | Allan et al. |
| 2005/0108104 A1 | 5/2005 | Woo |
| 2005/0108624 A1 | 5/2005 | Carrier |
| 2005/0114757 A1 | 5/2005 | Sahota et al. |
| 2005/0132196 A1 | 6/2005 | Dietl |
| 2005/0138086 A1 | 6/2005 | Pecht-Seibert |
| 2005/0138539 A1 | 6/2005 | Bravery et al. |
| 2005/0171746 A1 | 8/2005 | Thalhammer-Reyero |
| 2005/0198086 A1 | 9/2005 | Moore et al. |
| 2005/0198125 A1 | 9/2005 | Beck et al. |
| 2005/0198247 A1 | 9/2005 | Perry et al. |
| 2005/0223063 A1 | 10/2005 | Chang et al. |
| 2005/0223320 A1 | 10/2005 | Brintzenhofe et al. |
| 2005/0240876 A1 | 10/2005 | Myers et al. |
| 2005/0246304 A1 | 11/2005 | Knight et al. |
| 2005/0268222 A1 | 12/2005 | Cheng |
| 2006/0020586 A1 | 1/2006 | Prompt et al. |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0080657 A1 | 4/2006 | Goodman |
| 2006/0085409 A1 | 4/2006 | Rys et al. |
| 2006/0101037 A1 | 5/2006 | Brill et al. |
| 2006/0101051 A1 | 5/2006 | Carr et al. |
| 2006/0129978 A1 | 6/2006 | Abriani et al. |
| 2006/0143220 A1 | 6/2006 | Spencer |
| 2006/0161559 A1 | 7/2006 | Bordawekar et al. |
| 2006/0200754 A1 | 9/2006 | Kablesh et al. |
| 2007/0036433 A1 | 2/2007 | Teutsch |
| 2007/0050719 A1 | 3/2007 | Lui et al. |
| 2007/0061467 A1 | 3/2007 | Essey |
| 2007/0061706 A1 | 3/2007 | Cupala |
| 2007/0074106 A1 | 3/2007 | Ardeleanu |
| 2007/0094589 A1 | 4/2007 | Paoli |
| 2007/0100877 A1 | 5/2007 | Paoli |
| 2007/0101280 A1 | 5/2007 | Paoli |
| 2007/0118803 A1 | 5/2007 | Walker et al. |
| 2007/0130504 A1 | 6/2007 | Betancourt et al. |
| 2007/0186157 A1 | 8/2007 | Walker et al. |
| 2007/0208606 A1 | 9/2007 | MacKay et al. |
| 2007/0208769 A1 | 9/2007 | Boehm et al. |
| 2008/0028340 A1 | 1/2008 | Davis |

FOREIGN PATENT DOCUMENTS

| | | |
|---|---|---|
| EP | 0 961 197 | 12/1999 |
| EP | 1 076 290 A2 | 2/2001 |
| EP | 1221661 | 7/2002 |
| JP | 63085960 | 4/1988 |
| JP | 401173140 A | 7/1989 |
| JP | 3191429 | 8/1991 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 A1 | 6/2001 |
| WO | WO0157720 | 9/2006 |

OTHER PUBLICATIONS

"Microsoft Visual Basic 5.0 Programmer's Guide", *Microsoft Press*, (1997), pp. 42-43, 54-58.

"Microsoft Word 2000", Screenshots,(1999),1-5.

Adams, Susie , et al., "BizTalk Unleashed", Sams publishing, 2002, first printing Mar. 2001,1-2, 31-138.

Anat, Eyal , et al., "Integrating and Customizing Hererogeneous E-Commerce Applications", The VLDB Journal-The International Journal on Very Large Data Bases, vol. 10, Issue 1,(Aug. 2001), 16-38.

Beauchemin, Dave , "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew , et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007, (Aug. 2004).

Borland, Russo , "Running Microsoft Word 97", 314-315, 338, 361-362, 390, and 714-719.

Brabrand, et al., "Power Forms Declarative Client-side Form Field Validation", (2002),1-20.

Dubinko, Micah , "XForms and Microsoft InfoPath", Retrieved from the Internet at http://www.xml.com/lpt/a/1311 on Jan. 21, 2007,(Oct. 29, 2003).

Halberg, Bruce , et al., "Using Microsoft Excel 97", (1997),191-201, 213-219.

Hoffman, Michael , "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Lehtonen, Miro , et al., "A Dynamic User Interface for Document Assembly", Department of Computer Science, University of Helsinki,(Nov. 2002).

Nelson, Joe , "Client-side Form Validation Using JavaScript" *Developer Advisory*, (Sep. 21, 2001).

Raman, T. V., et al., "XForms 1.0", (Dec. 2001),Section 1-12.2.3 & Appendices A-G.
Rees, Michael J., "Evolving the Browser Towards a Standard User Interface Architecture", School of Information Technology, Bond University, Australia,(2001).
Singh, Darshan, "Microsoft InfoPath 2003 by Example", Retrieved from the Internet at http://www.perfectxml.com/InfoPath.asp on Jan. 21, 2007,(Apr. 20, 2003).
Udell, Jon, "InfoPath and XForms", Retrieved from the Internet at http://weblog.infoworld.com/udell/2003/02/26.html,(Feb. 26, 2003).
Vasters, Clemens F., "BizTalk Server 2000 A Beginner's Guide", Osborne/McGraw-Hill,(2001), 1-2, 359-402.
Villard, et al., "An Incremental XSLT Transformation Processor for XML Document Manipulation", http://www2002.org/CDROM/refereed/321, Printed on May 18, 2007,25 pages.
Microsoft Corporation, "Microsoft Computer Dictionary" Microsoft Press, Fifth Edition, p. 149.
Cover, XML Forms Architecture, retrieved at <<http://xml.coverpages.org/xfa.html>> on Aug. 17, 2006, Coverpages, Jun. 16, 1999.
Raggett, "HTML Tables", retrieved on Aug. 6, 2006, at <<http:www.//is-edu.hcmuns.edu.vn/WebLib/books/Web/Tel/html3-tables.html>>, W3C Internet Draft, Jul. 7, 1995, pp. 1-12.
"Webopedia Computer Dictionary" retrieved on May 9, 2006, at <<http://www.pewebopedia.com/TERM/O/OLE. html<<, Jupitermedia Corporation, 2006, pp. 1-7.
Altova, Inc., "XML Spy 4.0 Manual," Altova Inc. & Altova GmbH, coyright 1998-2001, Chapters 1, 2, and 6, encompassing pp. 1-17, 18-90, and 343-362.
Cybook, Inc.: "Copying the Search Form to Services-based Web Sites" INternet Article, (online) Jul. 26, 2004.*the whole document*.
Excel Developer Tip (hereinafter "Excel"), "Determining the Data Type of a Cell", May 13, 1998, p. 1 (available at http://jwalk.com/ss//excel/tips/tip62.htm).
Macromedia, Inc.: "Dreamweaver Technote, Changes in copying and pasting in Dreamweaver 4" Internet Article (online). *the whole document*.
Rado, Dave: "How to create a template that makes it easy for users to "fill in the blanks", without doing any programming" Microsoft Word MVP FAQ Site, (online) Apr. 30, 2004, the whole document.
Atova, "User Reference manual Version 4.4, XML Spy suite 4.4," Atova Ges.m.b.H and Altova, Inc., May 24, 2002, pages cover, copyright p. 1-565.
Altova et al. XML Spy, XML integrated Development Environments, Altova Inc., 2002, pp. 1-18.
Ben-Natan, Provisional Application No. 60/203,081, filed May 9, 2000, entitled "Internet platform for creating and supporting communities".
Ixia Soft, "Steamlining content creation, retrieval, and publishing on the Web using TEXTML Server and SML Spy 4 Suite in an integrated, Web publishing environment," (Partners's Whitepaper, published on the Web as of Jun. 6, 2002, downlowad pp. 1-16.
Kutay, U.S. Appl. No. 60/209,713, filed Jun. 5, 2000, entitled, "Methods and systems for accessing, organizing presenting and viewing data".
Microsoft Word 2000 (see Screen Shot "About Microsoft Word") Published 1983-1999 and Microsoft Excel 2000 (see Screen Shot "About Microsoft Excel") Published 1988-1999, Three pages.
Moore, U.S. Appl. No. 60/191,662, filed Mar. 23, 2000, entitled "Collection-based presistent digital archives".
"Validation with MSXML and XML Schema" Windows Developer Magazine Jan. 2002 pp. 35-38.
"Get more from SharePoint" Transform Magazine vol. 11 No. 3. Mar. 2002 pp. 13-15.
"Whitehill Composer" Whitehill Technologies Inc. 2 pages.
Laura Acklen & Reed Gilgen, "Using Corel Wordperfect 9". 251-284, 424-434, 583-586 (1998).
Bruce Halberg et al, "Using Microsoft Excel 97". Published 1997. Bestseller Edition. Pertinent pp. 1-9, 18-25, 85-89, 98-101, 106-113, 124-127, 144-147, 190-201, 209-210, 216-227, 581-590, 632-633, 650-655, 712-714.

LeBlond et al, "PC Magazine Guide to Quattro Pro for Windows". pp. 9-11, 42-61. Ziff-Davis Press, Copyright 1993 by the LeBlond Group.
Mansfield, "Excel 97 for Busy People", Published by Osborne/Mcgraw-Hill 1997 pp. 48-50.
"Microsoft Visual Basic 5.0 Programmer's Guide 1997"; pp. 578-579: Redmond WA 98052-6399.
Han et al., WebSplitter: A Unified XML Framework for Multi-Device Collaborative Web Browsing. 2000, ACM Conference on Cimputer Supported Cooperative Work, 10 pages.
IBM: Stack Algorithm for Extractin Subtree from Serialized Tree, Mar. 1, 1994, TDB-ACC-NONN94033, 3 pages.
U.S. Appl. No. 60/191,662, Kutay et al.
U.S. Appl. No. 60/203,081, Ben-Natan et al.
"Store and Organize Related Project Files in a Binder," Getting Results with Microsoft Office, 1990, pp. 109-112.
Barker et al., "Creating In-Line Objects Within An Integrated Editing Environment," IBM Technical Disclosure Bulletin, vol. 27, No. 5, Oct. 1984, p. 2962.
Berg A., "Naming and Binding: Monikers" Inside OLE, 1995, Chapter 9, pp. 431-490.
Clapp D., "The NeXT Application Kit Part I: Non-Responsive Classes," The NeXT Bible 1990, Chapter 16, pp. 275-293.
DiLascia et al., "Sweeper" Microsoft Interactive Developer, vol. 1, No. 1, 1996, 27 pages.
Herzner et al., "CDAM—Compound Document Access and Management. An Object-Oriented Approach" Multimedia Systems Interaction and Applications, 1992, Chapter 3, pp. 17-36.
Kobayashi et al., "An Update on BTRON-specification OS Development" IEEE 1991 pp. 132-140.
Peterson B., "Unix Variants," Unix Review, vol. 10, No. 4, Apr. 1992, pp. 29-31.
Pike et al., "Plan 9 from Bell Labs" UKUUG, Summer 1990, 10 pages.
Pike et al., "The Use of Name Spaces in Plan 9," Operating Systems Review vol. 27, No. 2, Apr. 1993, pp. 72-76.
Staneck W., "Internal and External Media" Electronic Publishing Unleashed, 1995, Chapter 22, pp. 510-542.
Zdonik S., "Object Management System Concepts," ACM, 1984, pp. 13-19.
Trupin J., "The Visual Programmer," Microsoft Systems Journal, Apr. 1996, pp. 103-105.
Description of Whitehill Composer software product producted by Whitehill Technologies Inc. available at <http://www.xml.com/pub/p/221> accessed on Apr. 8, 2004 two pages.
Pacheco et al., "Delphi 5 Developers Guide," Sams Publishing, 1999, Chapter 31, Section: Data Streaming, 6 pages.
Clarke, P., "From small beginnings," Knowledge Management, Nov. 2001, pp. 28-30.
Sun, Q., et al., "A robust and secure media signature scheme for JPEG images," Proceedings of 2002 IEEE Workshop on Multimedia Signal Processing, Dec. 2002, pp. 296-299.
Komatsu N., et al., "A Proposal on Digital Watermark in Document Image Communication and Its Application to Realizing a Signature" Electronics and Communications in Japan Part I: Communications vol. 73 No. 5 May 1990 pp. 22-33.
Noore, A., "A secure conditional access system using digital signature and encryption" 2003 Digest of Technical Papers. International Conference on Consumer Electronics Jun. 2003 pp. 220-221.
OMG XML Metadata Interchange (XMI) Specification Version 1.2 Jan. 2002.
Mott Corporation web page on Mott Porous Metal.
Brogden, William, "Arbortext Adept 8 Editor Review," O'Reilly XML.COM, 'Online! Sep. 22, 1999) XP002230080, retrieved from the Internet <URL:http://www.xml.com/pub/a/1999/09/adept/AdeptRvw.htm>, retrieved on Feb. 5, 2003.
Alschuler, Liora, "A tour of XMetal" O'Reilly XML.COM, 'Online! Jul. 14, 1999, XP002230081, retrieved from the Internet: <URL:http://www.xml.com/pub/a/SeyboldReport/ip031102.html>, retrieved on Feb. 5, 2003.
Davidow, Ari, "XML Editors: Allegations of Functionality in search of reality," Internet, 'Online! 1999, XP002230082, retrieved from the Internet, <URL:http://www.ivritype.com/xml/>.

Battle, Steven A. et al., "Flexible Information Presentation with XML", 1998, The Institution of Electrical Engineers, 6 pages.

Ciancarini, Paolo et al., "Managing Complex Documents Over the WWW: A Case Study for XML", IEEE Transactions on Knowledge and Data Engineering, vol. 11, No. 4, Jul./Aug. 1999, pp. 629-638.

Kanemoto, Hirotaka et al., "An Efficiently Updatable Index Scheme for Structured Documents", 1998 IEEE, pp. 991-996.

Usdin, Tommie et al., "XML: Not a Silver Bullet, But a Great Pipe Wrench", Standardview vol. 6, No. 3, Sep. 1998, pp. 125-132.

Sutanthavibul, Supoj et al., "XFIG Version 3.2 Patchlevel 2(Jul. 2, 1998) Users Manual (Edition 1.0)", Internet Document, [Online] Jul. 2, 1998, XP002229137 Retrieved from the Internet: <URL:http://www.ice.mtu.edu/online_docs/xfig332/> [retrieved on Jan. 28, 2003].

"Architecture for a Dynamic Information Area Control", IBM Technical Disclosure Bulletin, IBM Corp. New York, US, vol. 37, No. 10, Jan. 10, 1994, pp. 245-246.

Au, Irene et al., "Netscape Communicator's Collapsible Toolbars," CHI '98, Human Factors in Computing Systems, Conference Proceedings, Los Angeles, CA, Apr. 18-23, 1998, pp. 81-86.

Netscape Communication Corporation: "Netscape Communicator 4.61 for OS/2 Warp" Software, 1999, The whole software release & "Netscape—Version 4.61 [en]—010615" Netscape Screenshot, Oct. 2, 2002.

Hall, Richard Scott, "Agent-based Software Configuration and Deployment," Thesis of the University of Colorado, Online, Dec. 31, 1999, retrieved from the Internet on Nov. 7, 2003: <http://www.cs.colorado.edu/users/rickhall/documents/ThesisFinal.pdf>, 169 pages.

Van Hoff, Arthur et al., "The Open Software Description Format," Online, Aug. 13, 1997, retrieved from the Internet on Nov. 7, 2003: <http://www.w3.org/TR/NOTE-OSD>, 11 pages.

Netscape Communications Corp., "SmartUpdate Developer's Guide," Online, Mar. 11, 1999, retrieved from the Internet on Dec. 8, 2000: http://developer.netscape.com:80/docs/manuals/communicator/jarman/index.htm>, 83 pages.

Dayton, Linnea and Jack Davis, "Photo Shop 5/5.5 WOW! Book," 2000, Peachpit Press, pp. 8-17.

Williams, Sara and Charlie Kindel, "The Component Object Model: A Technical Overview," Oct. 1994, Microsoft Corp., pp. 1-14.

Varlamis, Iraklis et al., "Bridging XML-Schema and relational databases. A system for generating and manipulating relational databases using valid XML documents," DocEng '01, Nov. 9-10, 2001, Copyright 2001, ACM 1-58113-432-0/01/0011, pp. 105-114.

Hardy, Matthew R. B. et al., "Mapping and Displaying Structural Transformations between XML and PDF," DocEng '02, Nov. 8-9, 2002, Copyright 2002, ACM 1-58113-594-7/02/0011, pp. 95-102.

Kim, Sang-Kyun et al., "Immediate and Partial Validation Mechanism for the Conflict Resolution of Update Operations in XML Databases," WAIM 2002, LNCS 2419, 2002, pp. 387-396, Springer-Verlag Berlin Heidelberg 2002.

Chuang, Tyng-Ruey, "Generic Validation of Structural Content with Parametric Modules," ICFP '01, Sep. 3-5, 2001, Copyright 2001, ACM 1-58113-415-0/01/0009, pp. 98-109.

Chen, Ya Bing et al., "Designing Valid XML Views," ER 2002, LNCS 2503, 2002, Springer-Verlag Berlin Heidelberg 2002, pp. 463-477.

Chen, Yi et al., "XKvalidator: A Constraint Validator for XML," CIKM '02, Nov. 4-9, 2002, Copyright 2002, ACM 1-58113-492-4/02/0011, pp. 446-452.

Rogge, Boris et al., "Validating MPEG-21 Encapsulated Functional Metadata," IEEE 2002, pp. 209-212.

Nelson, Mark, "Validation with MSXML and XML Schema," Windows Developer Magazine, Jan. 2002. pp. 35-38.

Chien, Shu-Yao et al., "XML Document Versioning," SIGMOD Record, vol. 30, No. 3, Sep. 2001, pp. 46-53.

Wong, Raymond K. et al., "Managing and Querying Multi-Version XML Data with Update Logging," DocEng '02, Nov. 8-9, 2002, Copyright 2002, ACM 1-58113-594-7/02/0011, pp. 74-81.

Chien, Shu-Yao et al., "Efficient schemes for managing multiversionXML documents", VLDB Journal (2002), pp. 332-353.

Chien, Shu-Yao et al., "Efficient Management of Multiversion Documents by Object Referencing," Proceedings of the 27th VLDB Conference, 2001, pp. 291-300.

Chien, Shu-Yao et al., "Storing and Querying Multiversion XML Documents using Durable Node Numbers," IEEE 2002, pp. 232-241.

Dyck, Timothy, "XML Spy Tops as XML Editor," http://www.eweek.com/article2/0,3959,724041,00.asp, Nov. 25, 2002, 4 pages.

"Netscape window" Netscape Screenshot, Oct. 2, 2002.

Haukeland, Jan-Henrick, "Tsbiff-tildeslash biff—version 1.2.1" Internet Document, [Online] Jun. 1999, URL:http://web.archive.org/web/19990912001527/http://www.tildeslash.com/tsbiff/.

U.S. Appl. No. 60/209,713, filed Jun. 5, 2000.

James Clark, Editor; "XSL Transformation (XSLT) Version 1.0", Nov. 16, 1999, W3C (MIT, INRIA, Keio), pp. 1-156.

James Clark and Steve Derose, "XML Path Language (XPath) Version 1.0", Nov. 16, 1999, W3C (MIT, INRIA, Keio), pp. 1-49.

Musgrave, S., "Networking technology—impact and opportunities", Survey and Statistical Computing 1996. Proceedings of the Second ASC International Conference. Sep. 1996. pp. 369-378. London, UK.

Rapaport, L., "Get more from SharePoint", Transform Magazine, vol. 11, No. 3, Mar. 2002, pp. 13, 15.

McCright, J.S., "New Tool Kit to Link Groove with Microsoft SharePoint", eWeek, Enterprise News & Reviews, Ziff Davis Media Inc., Jul. 29, 2002, 1 page.

Hwang, Kai et al., "Micro-Firewalls for Dynamic Network Security with Distributed Intustion Detection," IEEE Int'l. Symposium on Network Computing and Applications, 2001 pp. 68-79.

Schmid, M. et al., "Protecting Data from Malicious Software," 18th Annual Security Applications Conference, 2002, pp. 199-208.

Kaiya, Haruhiko et al., "Specifying Runtime Environments and Functionalities of Downloadable Components under the Sandbox Model," Int'l. Symposium on Principles of Software Evolution, 2000, pp. 138-142.

Prevelakis, Vassilis et al., "Sandboxing Applications," FREENIX Track: 2001 USENIX Annual Technical Conference, pp. 119-126.

Tomimori, Hiroyuki et al., "An Efficient and Flexible Access Control Framework for Jav aPrograms in Mobile Terminals," Proceedings of 22nd Int'l. Conference on Distributed Computing Systems Workshops, 2002, pp. 777-782.

Pacheco, Xavier et al., "Delphi 5 Developer's Guide", Sams Publishing. Chapter 31, Section: Data Streaming,(1999),4.

Bradley, Neil, "The XML Companion, Third Edition," published by Addison Wesley Professional, http://proquest.safaribooksonline.com0201770598, (Dec. 12, 2001), pp. 1-18.

Hu et al., "A Programmable Editor for Developing Structured Documents based on Bidirectional Transformations," ACM, (Aug. 2004), pp. 178-189.

Klarlund, Nils et al., "DSD: A Schema Language for XML," ACM, FSMP Portland, Oregon, (2000), pp. 101-111.

U.S. Office Action mailed Oct. 28, 2003 cited in U.S. Appl. No. 09/599,086.

U.S. Final Office Action mailed May 25, 2004 cited in U.S. Appl. No. 09/599,086.

U.S. Office Action mailed Mar. 3, 2005 cited in U.S. Appl. No. 09/599,086.

U.S. Final Office Action mailed Aug. 8, 2005 cited in U.S. Appl. No. 09/599,086.

U.S. Office Action mailed Jan. 30, 2006 cited in U.S. Appl. No. 09/599,086.

U.S. Final Office Action mailed Jul. 5, 2006 cited in U.S. Appl. No. 09/599,086.

U.S. Office Action mailed Nov. 13, 2006 cited in U.S. Appl. No. 09/599,086.

U.S. Final Office Action mailed May 10, 2007 cited in U.S. Application No. 09/599,086.

U.S. Office Action mailed Oct. 31, 2007 cited in U.S. Appl. No. 09/599,086.

U.S. Final Office Action mailed Mar. 6, 2008 cited in U.S. Appl. No. 09/599,086.

U.S. Office Action mailed Jul. 18, 2007 cited in U.S. Appl. No. 10/898,657.

U.S. Final Office Action mailed Jan. 3, 2008 cited in U.S. Appl. No. 10/898,657.

U.S. Office Action mailed Sep. 8, 2008 cited in U.S. Appl. No. 10/898,657.

U.S. Office Action mailed Jul. 13, 2007 cited in U.S. Appl. No. 10/898,656.

U.S. Final Office Action mailed Nov. 15, 2007 cited in U.S. Appl. No. 10/898,656.

U.S. Office Action mailed Apr. 18, 2008 cited in U.S. Appl. No. 10/898,656.

U.S. Appl. No. 09/599,086, filed Jun. 21, 2000, Confirmation No. 6625.

Watt, Andrew, "Microsoft Office Infopath 2003 Kick Start," (published by Sams) Print ISBN-10:0-672-32623-X, (Mar. 24, 2004), pp. 1-57.

U.S. Office Action mailed Nov. 14, 2008 cited in U.S. Appl. No. 09/599,086, 59 pages.

"Whitehill Composer" Whitehill Technologies Inc. 2 pages, 2000.

XMLSPY, "XmlSpy 2004 Enterprise Edition Manual", Altova,(May 17, 2004),1-25, 220-225.

Stylusstudio, "StylusStudio: XPath Tools", 2004-2007, StylusStudio,1-14.

Dodds, "Toward an XPath API", xml.com,(May 7, 2001),1-3.

Altova, "Altova Tools for XPath 1.0/2.0", Altova,1-12, 2007.

"Microsoft Word 2000 Screenshots", Word,(2000),1-17.

Grosso, et al., "XML Fragment Interchange", W3C,(Feb. 2001),1-28.

Altova, et al., "User and Reference Manual Version 4.4", www.xmlspy.com, (May 24, 2007), 1-565.

"XForm 1.0", W3C,(Jul. 16, 2001).

"Microsoft Word 2000 Screenshots", (2000),11-17.

* cited by examiner

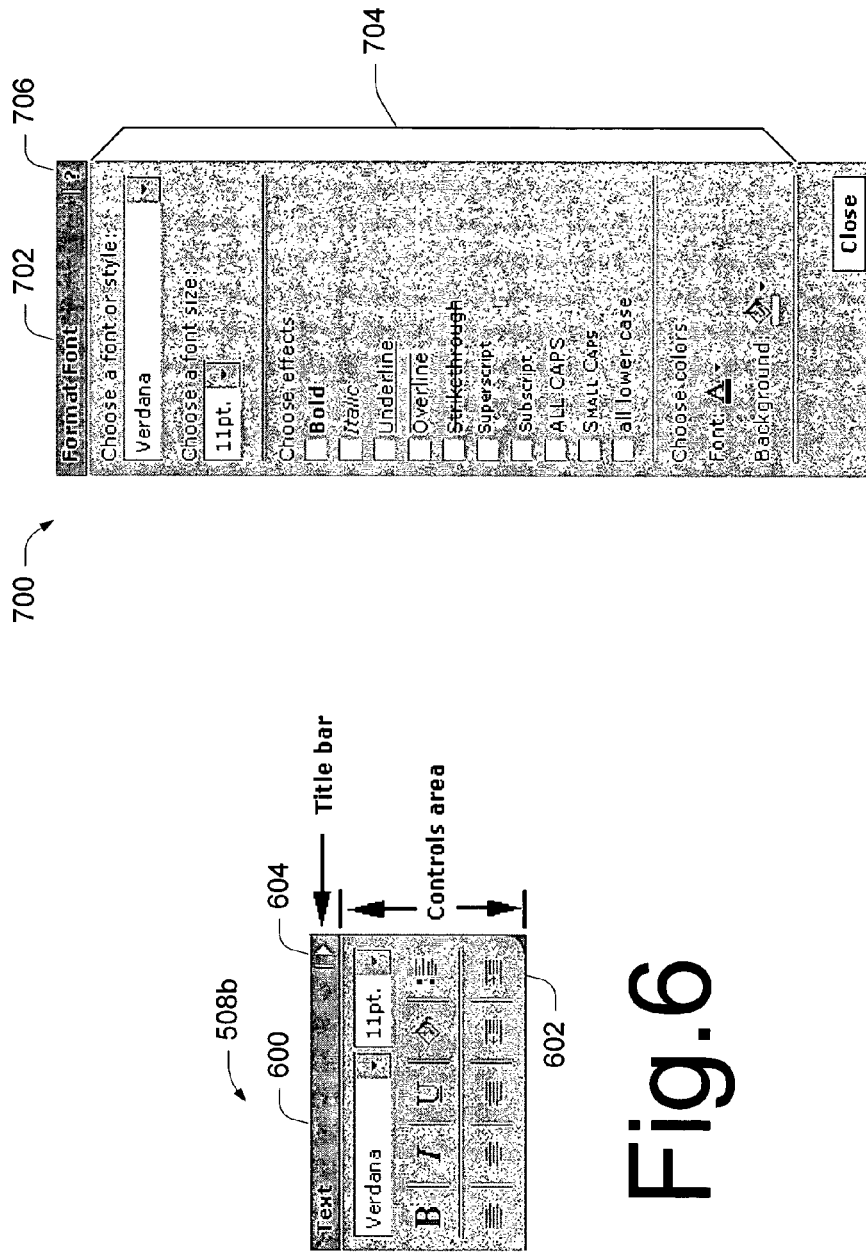

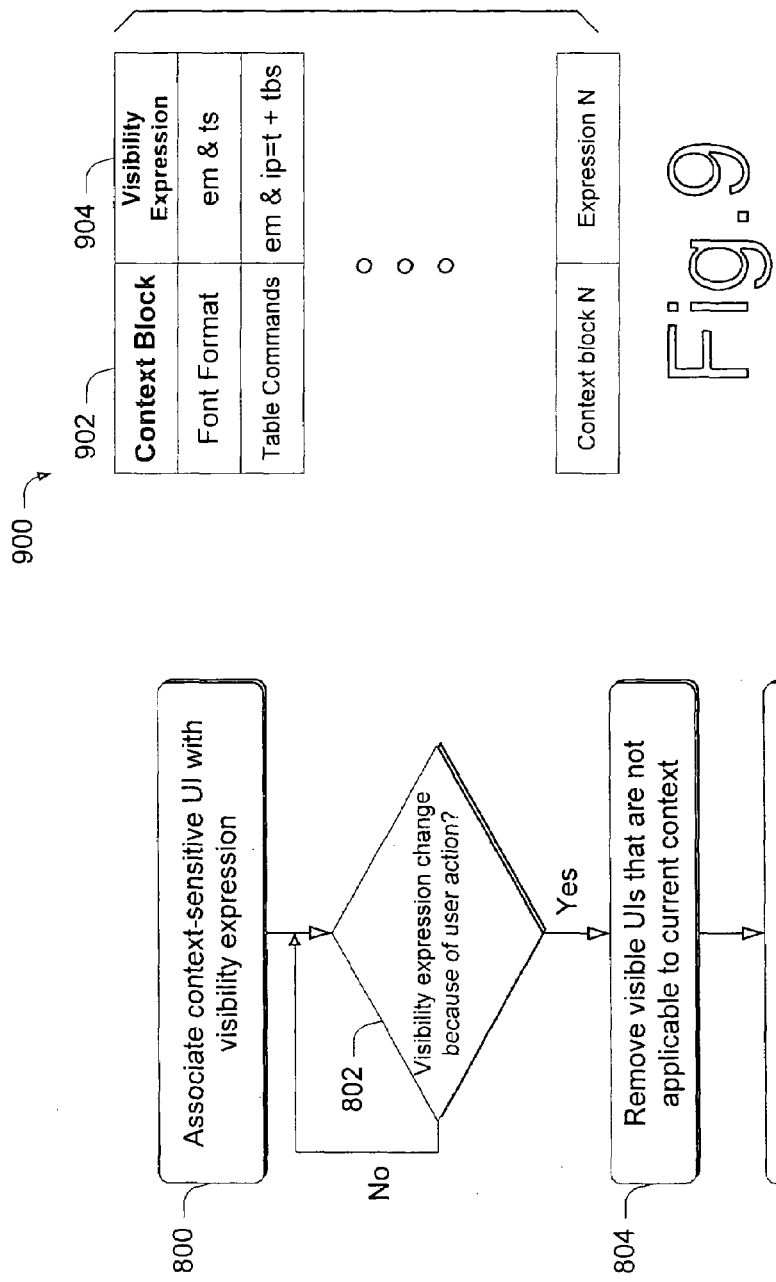

Fig. 13

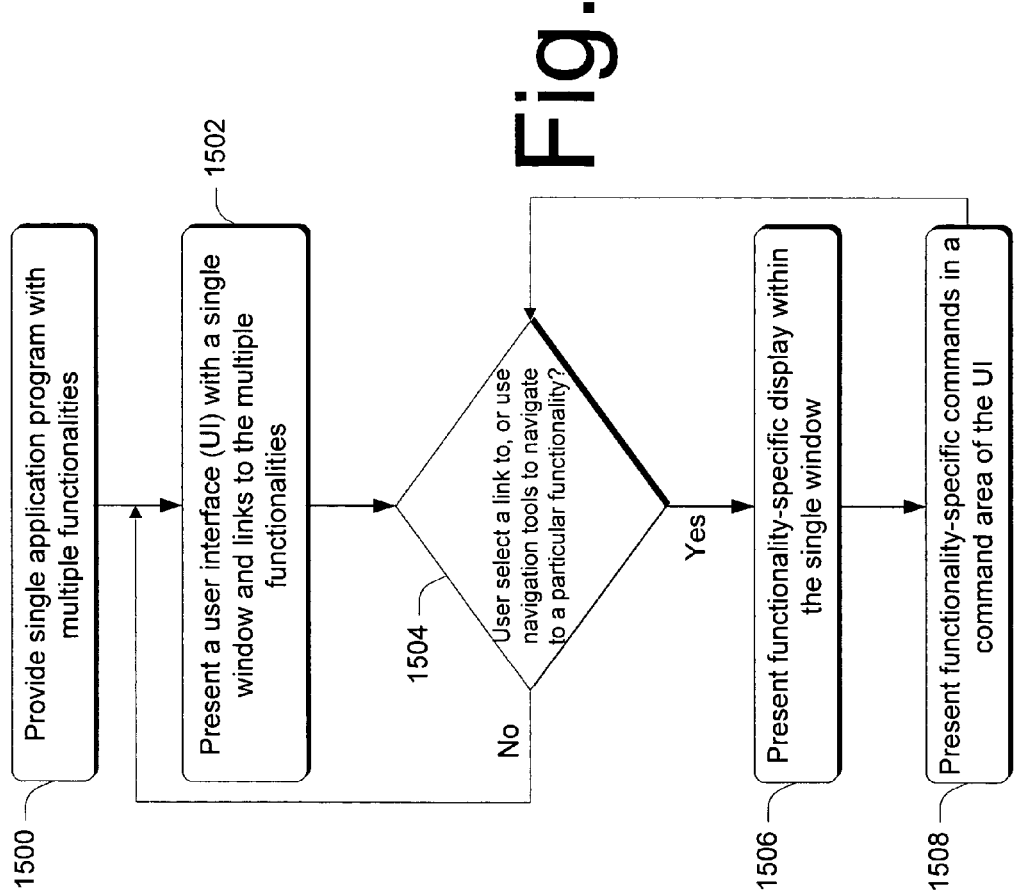

TASK-SENSITIVE METHODS AND SYSTEMS FOR DISPLAYING COMMAND SETS

RELATED APPLICATIONS

This application is a divisional application of and claims priority to U.S. patent application Ser. No. 09/599,086, filed on Jun. 21, 2000, the disclosure of which is incorporated by reference herein.

In addition, the following patent applications are related to the present application, are assigned to the assignee of this patent application, and are expressly incorporated by reference herein:

- U.S. patent application Ser. No. 09/599,298, entitled "Single Window Navigation Methods and Systems", and filed on the same date as this patent application;
- U.S. patent application Ser. No. 09/599,806, entitled "Methods and Systems of Providing Information to Computer Users", and filed on the same date as this patent application;
- U.S. patent application Ser. No. 09/599,299, entitled "Methods, Systems, Architectures and Data Structures For Delivering Software via a Network", and filed on the same date as this patent application;
- U.S. patent application Ser. No. 09/599,048, entitled "Network-based Software Extensions", and filed on the same date as this patent application;
- U.S. patent application Ser. No. 09/599,813, entitled "Authoring Arbitrary XML Documents Using DHTML and XSLT", and filed on the same date as this patent application;
- U.S. patent application Ser. No. 09/599,812, entitled "Architectures For And Methods Of Providing Network-based Software Extensions", and filed on the same date as this patent application.

TECHNICAL FIELD

This invention relates generally to methods and systems that expose commands in software application programs.

BACKGROUND

Typically, application programs contain command sets that include individual commands that can be used by a user when working in a particular application program. These commands are specific to the purpose of the application program. For example, a word processing application program will typically include a command set that can be used to manipulate the text and/or format of a document. These command sets, however, are not always as easy to use as one would like. This situation can be complicated when a user is not familiar with the command set of an application program that they are currently using.

Current problems with application program command sets include that they can be difficult to use or browse because of the large number of commands that can be included in a command set, and that they often times can temporarily obscure a document when a user attempts to use them. In addition, command sets are typically presented in a manner that is not related to the tasks in which the user might be engaged.

With respect to the browsing difficulty of command sets, consider the following. Command sets can typically contain many different commands that are available for use. Since, in a typical user display, there is only a limited amount of space to present information without undesirably obscuring a work area, it logically follows that not all commands can be displayed at all times for the user. To address this problem, solutions have included providing a static tool bar that can expose some commands and contain a menu structure that can be browsed by the user. Consider, for example, FIG. 1 which shows an exemplary user display 10 that includes a tool bar 12 that includes a menu structure 14 and a collection of commands 16. The menu structure 14 includes individual entries, e.g. "File", "Edit", "View", "Insert", etc. Each of these entries is associated with a drop down menu that contains a collection of individual commands that are logically related to their entry. For example, for the "File" entry, individual drop down menu-accessible commands include "new", "open", "close", "print", "print preview" and additional commands that are accessible via an "options" selection that further extends the drop down menu to display the additional commands. Each of the top line menu entries in the menu structure 14 can be associated with a drop down menu. Also, some of the commands are gathered into broad groups (such as the Font Formatting dialog) and the user needs to know what Font Formatting is, in order to find the commands in this group. Needless to say, the number of available commands can often times be quite numerous so that browsing through them is not an easy task. In addition, an inherent inefficiency with this approach is that many if not most of the displayed commands will have little or nothing to do with what the user is currently looking for. Often, in fact, many of the commands are grayed out and disabled because they are not relevant to the current task. Regardless, they are exposed to the full subset of commands.

Consider how this problem is exacerbated when a user is only moderately familiar or not familiar at all with an application program. Having to figure out and navigate through an extensive set of commands that are not explained (except for perhaps a "Help" dialog) can make the user's experience difficult and time consuming. In addition, many application programs are physically or logically tapped out as far as including additional commands. Specifically, in many application programs there are simply so many commands in the command set that including more commands would require the menu structure to include more "options" buttons that, in turn, would present more and more commands, thus requiring a user to physically navigate through more commands.

Additionally, many application programs display their command sets in a manner that can obscure the work area for the user. For example, consider FIG. 2 which shows a "Font" dialog box 18 that is presented in the middle of the user's work area. To get to this dialog box, the user had to click on the "Format" menu entry in menu structure 14, and then select the "Font" command within the drop down menu that was presented. As a result the illustrated dialog box 18 is displayed. Although this is helpful for enabling a user to see an extensive list of commands, it is not optimal for a couple of different reasons. First, the user's document is partially obscured by the dialog box 18. This is undesirable because the user may wish to keep the work area in view. In addition, in order to work within the dialog box, the user has to quit working within their document. Thus, the dialog box is referred to as having "mode" or being "modal", meaning that a user must enter into a particular mode that renders them unable to work within their document in order to work within the dialog box. Second, and perhaps more important, the user's command selection is not implemented immediately, and, even if it were, the document is obscured by the dialog box. Specifically, in order to have a command implemented, e.g. a "strikethrough" command, the user must select text in the document that they are working on and pull up the dialog box. Only after they click on the "strikethrough" box and on the "OK" box is the command implemented (this is somewhat related to the mode aspect mentioned above). In addition, if a user desires to implement a command on multiple different portions of text, they must separately select each text portion and apply the command for each selected portion of text. That is, for each portion of text, they must separately and individually pull up the appropriate dialog box to apply the command. This is not optimal.

Consider also the collection of commands 16. Many application programs provide such a feature where frequently used commands are displayed in a manner in which they can be quickly clicked on by a user and applied within the context of the application program. These commands are often presented as so-called "modeless" commands (as contrasted with "modal" commands) because they can be used while still working within a document. That is, in the illustrated example, individual commands from the collection include "bold", "italics", and "underline" commands. Yet, even though the goal of displaying these frequently-used commands is directed to improving user efficiency, this attempt falls short of the mark for the following reason. Even though the commands that are displayed might be considered as those that are most frequently used, their use occurrence may constitute only a very small portion of a user session, if at all. To this extent, having the commands displayed when they are not being used is wasteful in that valuable display real estate is consumed. This is a direct manifestation of the fact that the displayed commands have nothing to do with the specific context of the user. Yes—the user might in the course of their computing session have the need to use a particular command, but until that command is specifically needed by the user, its display bears no logical relation to the user's computing context.

Accordingly, this invention arose out of concerns associated with providing improved methods and systems for presenting command sets to users. Specifically, the invention arose out of concerns associated with providing methods and systems of presenting commands in a task-sensitive manner, which assist in using physical screen space in a more efficient manner.

SUMMARY

Methods and systems present commands to a user within a software application program by determining the user's context within the application program and automatically presenting in a user interface context-sensitive commands that pertain to the user's current context. When the user's context changes, the context-sensitive commands are automatically added to the user interface or removed from the user interface so that space can be freed up for additional, more relevant commands.

In one implementation context blocks and context panes are employed to present the commands. The context blocks and panes are displayed in a context UI container that is located adjacent a document area in a user interface. When displayed, the context blocks and context panes do not obscure a user's document.

The context blocks and panes each comprise a title bar area that labels the block or pane, and a controls area that presents commands to the user. The commands within the controls area can be logically grouped. The context blocks contain primary commands that pertain to a user's present context. More than one context block can be displayed in the context UI container. Context panes are associated with a context block and are not automatically displayed. Rather, a user can select one or more context panes from a particular context block, keyboard shortcut, or from other tool bars. The context panes contain additional commands that are logically associated with the commands of their associated context block. When displayed, the context panes replace the context blocks in the context UI container and must be closed by the user.

In one embodiment, a user's context is determined by monitoring the user's action within a particular application program. A series of expressions are provided and describe conditions that are associated with aspects of a user's interaction with the application program. Each expression is associated with a context block. As the user's context changes, at least portions of the expressions are evaluated to determine whether its associated context block should be displayed. In one optimization, each expression is represented as a tree structure with a root node and multiple nodes associated with the root node. Each of the nodes has a value associated with it that can change as a user's context changes. When a user's context changes, individual node values are evaluated for a change. If a node value changes, then its parent node is notified with the change. The parent node then evaluates its value to ascertain whether it has changed responsive to its child's value change. This process continues whenever a node value changes. If the root node value changes, then the context block with which it is associated is either automatically displayed or removed.

In one particular advantageous implementation, a single application program is provided with a single navigable window. The application program comprises multiple different functionalities to which the single navigable window can be navigated. The different functionalities enable a user to accomplish different tasks. For example, in one implementation, a user might read electronic mail, compose an electronic mail message, or navigate to sites on the web. As the user navigates between functionalities and as their context changes within particular functionalities, context blocks are automatically presented and/or removed so that they can have useful commands at hand to use. The functionalities of the single application program are desirably extensible, e.g. by incorporating third party functionalities that can be delivered over the web, so that the application can incorporate many different types of functionalities. Each of the incorporated functionalities can come with its own collection of automatically displayable context blocks.

BRIEF DESCRIPTION OF THE DRAWINGS

FIG. 6 is a diagram of an exemplary context block in accordance with one described embodiment.

FIG. 7 is a diagram of an exemplary context pane in accordance with one described embodiment.

FIG. 8 is a flow diagram that describes steps in a method in accordance with one described embodiment.

FIG. 9 is a diagram of a table in accordance with one described embodiment.

FIG. 13 is a diagram of a user interface in accordance with one described to embodiment that illustrates an exemplary functionality.

FIG. 15 is a flow diagram that describes steps in a method in accordance with one described embodiment.

DETAILED DESCRIPTION

Overview

The methods and systems described below present commands to a user within a software application program by determining the user's context within the application program and automatically presenting, in a user interface, context-sensitive commands that pertain to the user's current context. When the user's context changes, the context-sensitive commands can be automatically removed from the user interface.

Exemplary Computer System

Figure 1:
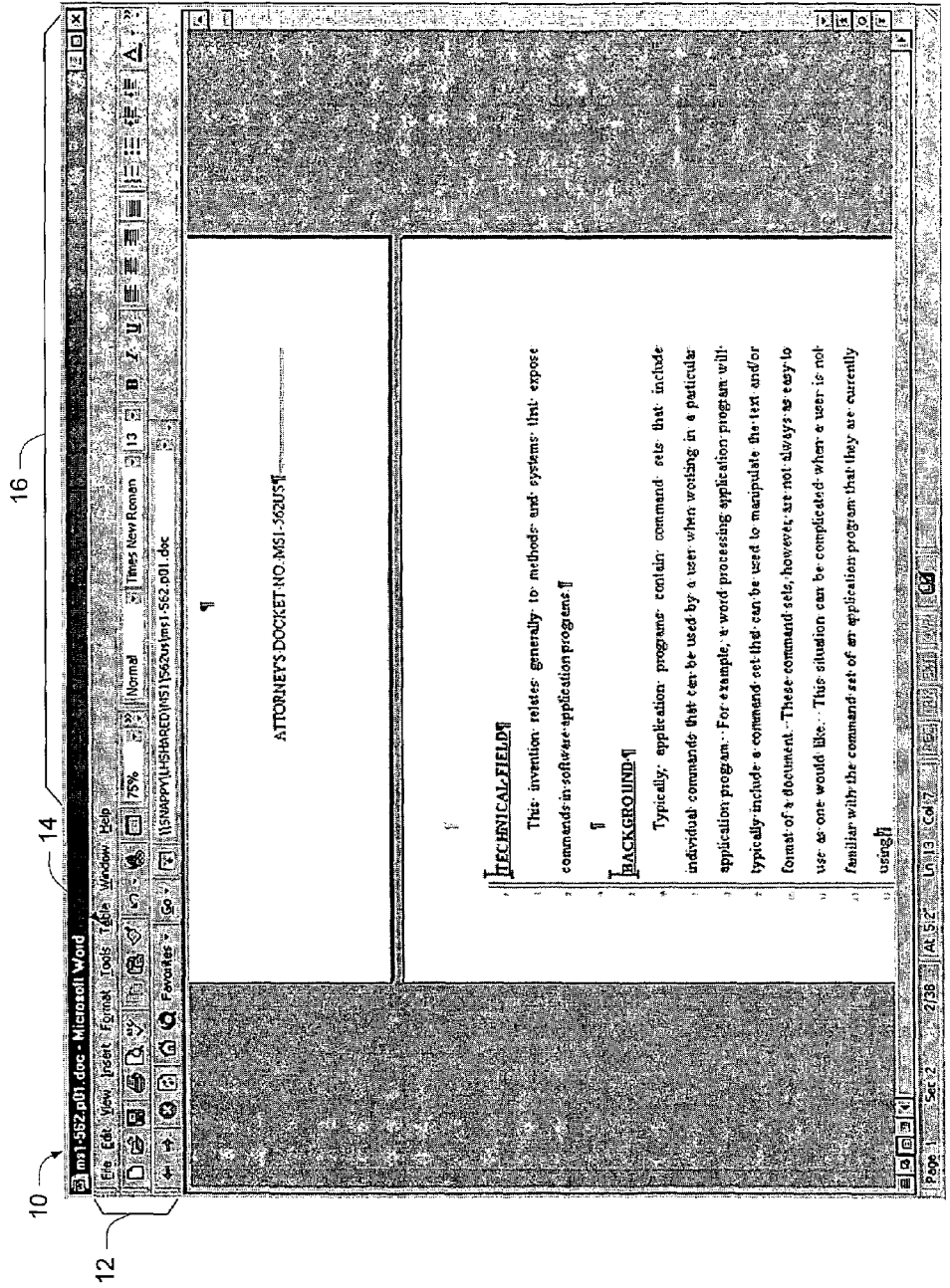
FIG. 1 is an illustration of an exemplary user display in accordance with the prior art.
Figure 2:
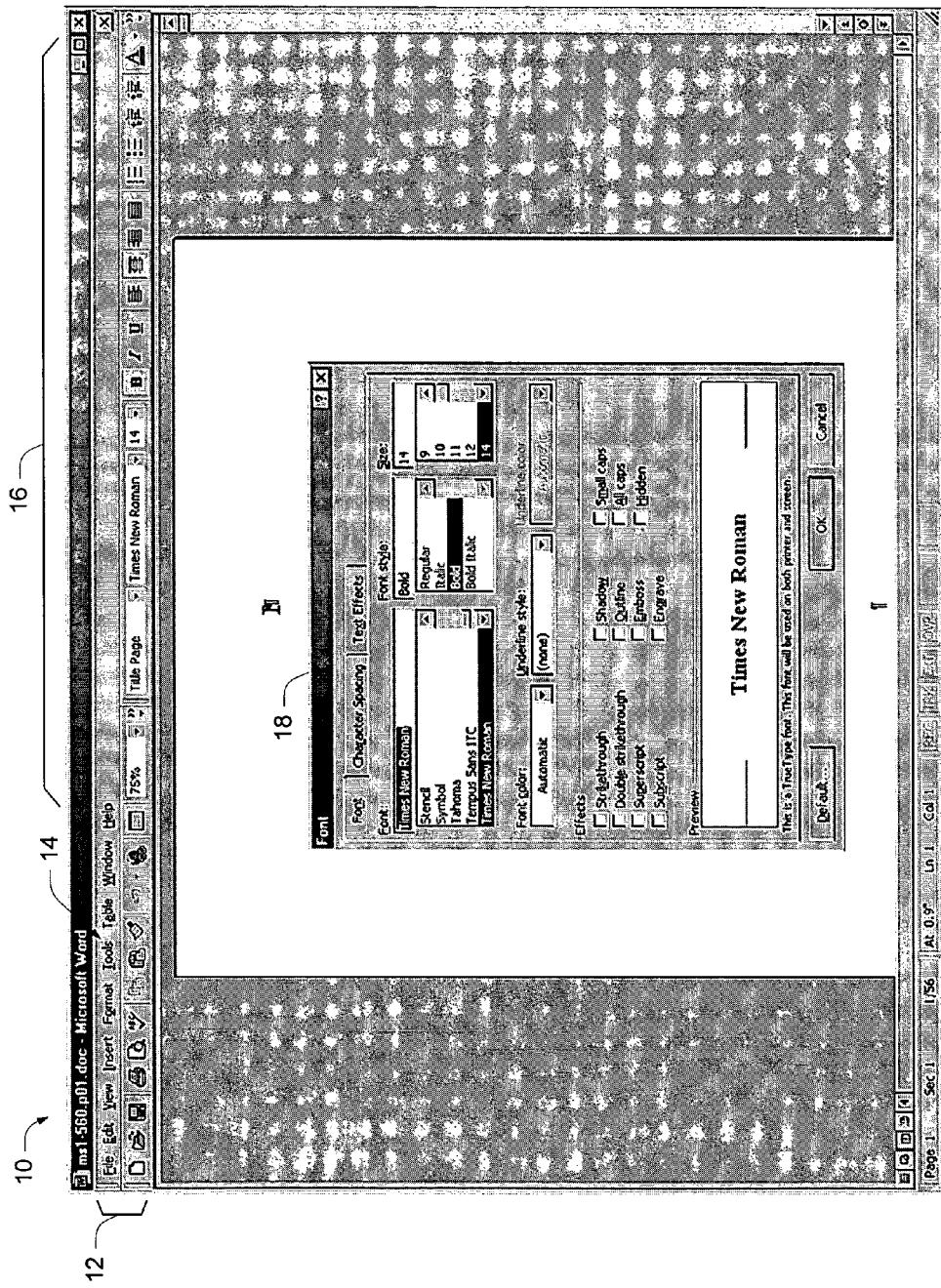
FIG. 2 is an illustration of an exemplary user display that includes a dialog box in accordance with the prior art.
Figure 3:
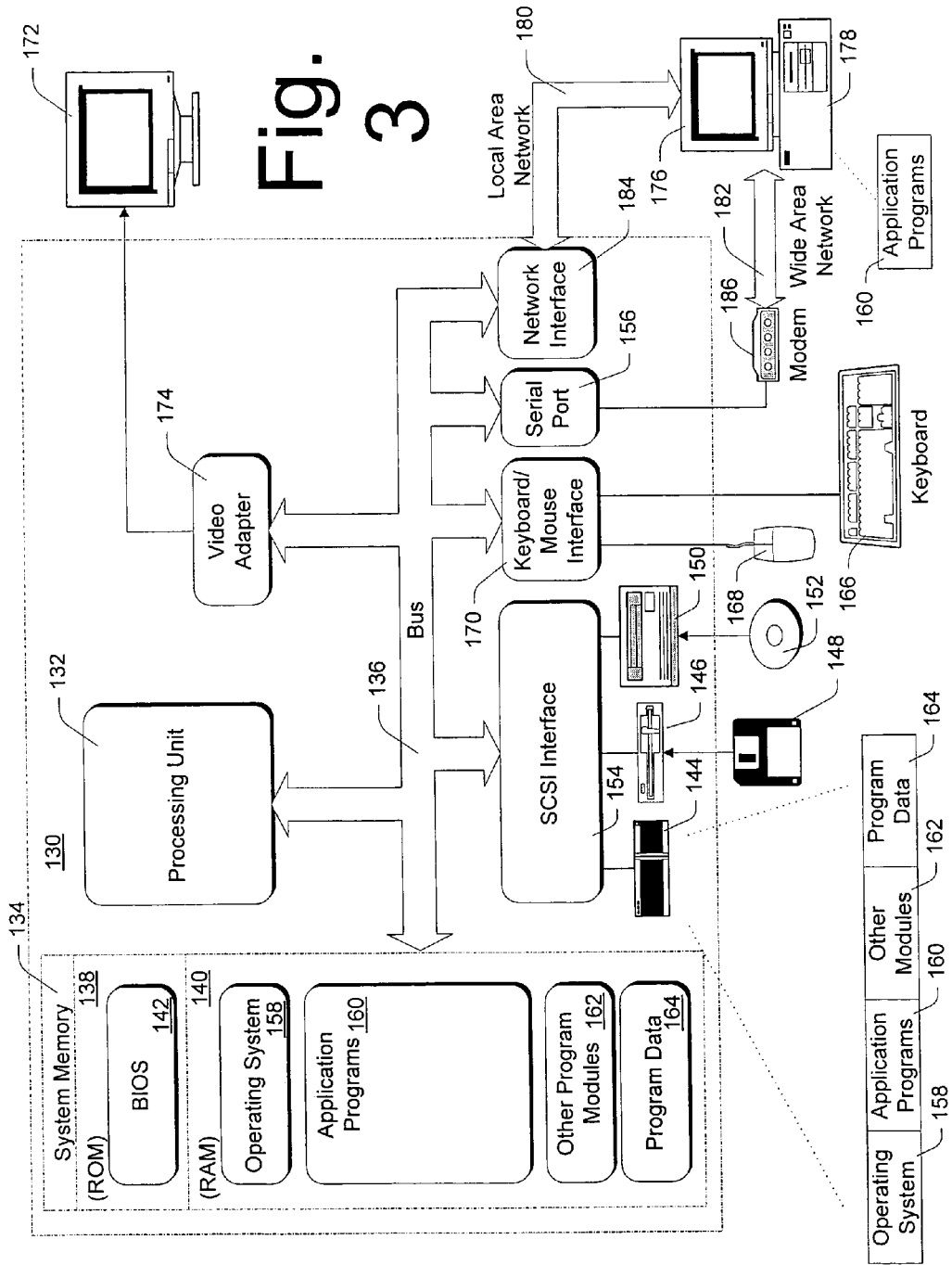
FIG. 3 is a high level block diagram of an exemplary computer system that can be utilized to implement various inventive embodiments.

FIG. 3 shows an exemplary computer system that can be utilized to implement the embodiment described herein. Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 3. The logical connections depicted in FIG. 3 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Context Sensitive Commands

In the described embodiment, command sets that include one or more individual commands are automatically presented to a user depending on the user's context. Specifically, depending on the type of action the user has taken, commands that are specific to that action will appear automatically thus obviating the need for the user to hunt through a menu structure to find commands of interest. This improves upon past approaches, which always presented top level commands, even when they were not needed by the user. This is also advantageous from the standpoint of assisting users who are unfamiliar with a particular software application. In the past, these users would have to hunt through an unfamiliar menu structure to find commands that may or may not be pertinent to an action that the user desired to take. Users also had to know the names of the functionality in order to find the tools (e.g. the user needed to know what a "table" was to know that there are tools for tables in an appropriate menu). In the present case, contextually-appropriate commands are automatically presented and removed in an interface so that a user need not worry about finding appropriate commands. That is, the described embodiment maintains an invariant that contextually applicable commands are visible and other non-applicable commands are hidden from the user.

As an example, consider the following: A user is working in a word processing application and is in the process of preparing a document. The user selects, with their cursor, a portion of the text that they believe to be spelled incorrectly. Instead of having to go to a tool bar menu at the top of the document and pull down one or more other menus to find the spell checking feature, a spell checking context block automatically appears in an interface adjacent the document. The user can then correct the incorrectly spelled word using the spell checking context block. Once the word is corrected and the user's context is not longer associated with an incorrectly spelled word, the spell checking context block automatically disappears. As the user's context changes within their document, so too do the sets of automatically presented and removed commands. Consider further that the user has included a table in their document and that they wish to manipulate the table or its contents with table specific commands. In the past, the user would typically have to pull down a table menu entry and then select from one or more commands, some of which might present a dialog box that would obscure the user's document. In the present example, a user would simply select the table by placing the cursor inside of the table to have table-specific commands that are contextually accurate and appropriate automatically displayed in a dedicated space. Thus, a user need not hunt through a large menu structure to find commands that are appropriate for use. Here, contextually proper commands are automatically presented for the user. As the user's context changes, so too do the displayed command sets.

Figure 4:
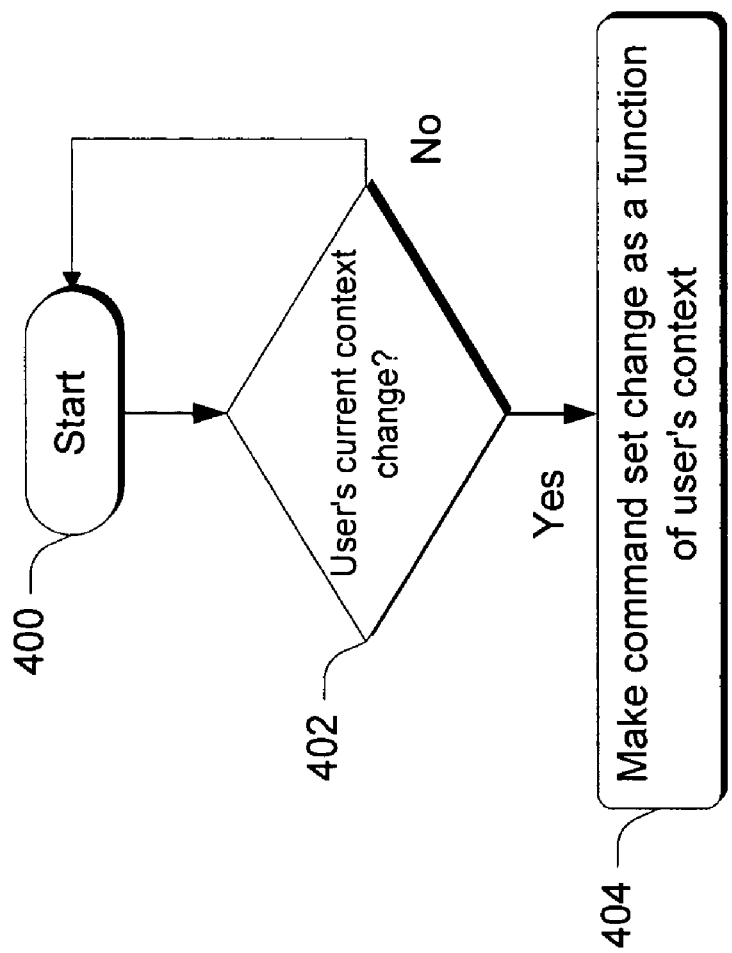
FIG. 4 is a flow diagram that describes steps in a method in accordance with one described embodiment.

FIG. 4 is a flow diagram that describes steps in a method in accordance with the described embodiment. The illustrated method can be implemented in any suitable hardware, software, firmware, or combination thereof. In the present example, the method is implement in software that is executing on a user's computer.

At step 400 the method starts and step 402 then determines whether the user's current context has changed. The user's current context relates to various tasks that the user is attempting to accomplish. Context can be determined from almost any detectable state in a program. In the above example, two exemplary tasks included correcting an incorrectly-spelled word and manipulating the contents of a table. The context associated with each of these tasks can be determined from such things as the type of document a user is working in (i.e. which of the multiple different functionalities the user is accessing), the state that the document is currently in, for example, whether the document is in read-only (or browse) mode or is editable, the cursor's current location within a document (i.e. is the cursor located within a table, spreadsheet, etc. within a document), or, a particular selection that might be made within the document (i.e. selection of text, a table, etc.). Other examples of things from which context can be determined include, without limitation, whether or not a certain extension has been installed, today's date is after the due date of a particular document, the document contains comments that need to be addressed, the subject line of an email message is missing, the document contains misspelled words, and the like. Any suitable way can be used to ascertain whether a user's context has changed.

If step 402 ascertains that a user's current context has changed, step 404 makes a command set change as a function of the user's context. Specifically, command sets can be added and/or removed automatically based upon the user's context.

Context Container, Context Blocks, Context Panes

Figure 5:
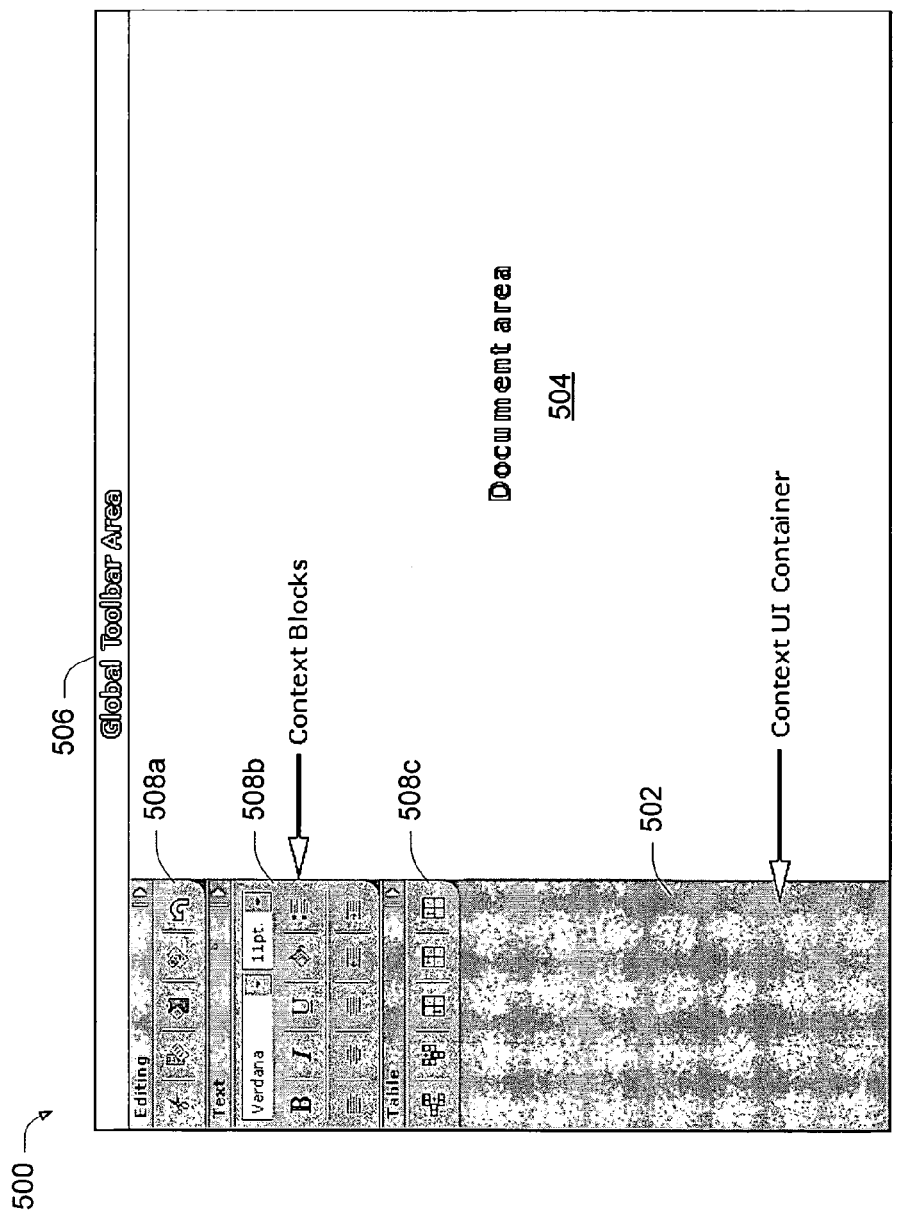
FIG. 5 is a diagram of an exemplary user interface in accordance with one described embodiment.

FIG. 5 shows an exemplary user interface (UI) display 500 that constitutes but one implementation of a system that automatically presents context-sensitive commands to a user. Other implementations can, of course, be used without departing from the claimed subject matter.

In the illustrated example, display 500 includes a context UI container 502 and a document area 504 adjacent the context UI container. The context UI container is a narrow, vertically aligned user interface space that can be used to expose commands in a software application. The context UI container 502 is designed, in a particular implementation, to work with applications whose functionalities are primarily oriented around interacting with documents. The context UI container 502 does not preclude other UI constructs in the application, and indeed this design assumes some additional UI such as a toolbar with commands on it such as would be displayed in global toolbar area 506. Such commands can include, without limitation, an address well for a web browser, a "Create New" button for creating a new document type, or a button that brings up "search" or "help".

The context UI container 502 is designed, in this example, to lay to the left of the document area 504 in the application. It could, however, be situated in any suitable location. The context UI container 502 contains two types of objects that are utilized to display context-sensitive commands to a user. A first type of object is a context block, exemplary ones of which are shown at 508a-c. Context blocks are essentially context-based palettes with command "shortcuts", giving the user top-level tools for the current user contexts. In the present example, there are context blocks for editing commands (block 508a), text commands (block 508b), and table commands (block 508c). The assumption in this example is that a user has a table selected, and thus all three of these blocks are relevant. A second type of object is a context pane. Context panes provide access to secondary tools for a context and are used to complete a specific task. The secondary tools are generally more specific or more advanced functionalities relating to the context block with which the pane is associated.

In the described embodiment, context blocks automatically appear and disappear based on the user's context and have two primary forms when visible: expanded and collapsed. Context blocks are expanded by default and collapse only by manual action from the user. Context panes take up the entire context UI container 502 and focus the user on completing a task before they can continue with other commands in the application.

Context UI Container

The context UI container 502 is a collapsible vertical area that contains context blocks and context panes. The context UI container 502 can toggle between expanded and collapsed states as indicated above. When collapsed, the container is not visible at all. When expanded, the context UI container 502 is typically of a fixed size, e.g. 184 pixels wide, though it can grow wider to accommodate wider context blocks or context panes.

Changing the Context UI Container Expansion State

In the described embodiment, the user can manually change the expansion state of the context UI container by clicking on a "Tools" button on a global toolbar in an application. This button can toggle container's expansion state. When the container is expanded, the button is visualized as toggled "on". When the container is collapsed, the button is visualized as toggled "off".

In addition, the context UI container 502 can be expanded programmatically. For example, if the user clicks on a command elsewhere in the application that requires that the container to be open, then the context UI container automatically opens. When the context UI container opens, the left border of the document being viewed by the application shifts over and the document's total width is decreased by the size of the context UI container 502.

Population of the Context UI Container

The context UI container 502 can be populated with both context blocks or context panes. In addition, the context UI container can be populated with a help pane. The help pane looks like a context pane, but appears next to either a context pane or the context blocks; it is approximately the same size and shape as a context pane, is launched programmatically, and is associated with a context block or context pane. Context blocks appear in the context UI container by default. Exemplary context blocks 508*a-c* are shown in FIG. 5. Context block 508*a* contains commands that are associated with editing a document; context block 508*b* contains commands that are associated with manipulating text within a document; and context block 508*c* contains commands blocks that are associated with operating on a table. As is evident, more than one context block can be displayed at one time.

Context panes, on the other hand, are configured in this example so that they can only be viewed one at a time. And, while context blocks are displayed automatically depending on the user's context, context panes are displayed, in this example, when they are selected by a user. Context panes are task oriented and are dismissed by a user when the task is completed. Although the user dismisses them, context panes are modeless in that the user can continue acting on the document while the pane is open. Context panes can also be used to communicate an alert to a user. For example, if the user is trying to publish a document, but cannot do so because of a merge conflict, a merge conflict user interface may be provided through a context pane.

To determine which context blocks to automatically display, one implementation uses an expression-based system that ascertains the user's context and then sees to it that the proper context blocks are displayed. An exemplary expression-based system is described in more detail below in a section entitled "Expression Evaluation".

Sizing and Overflow Issues

The context UI container 502 is of fixed size vertically, but the number and size of context blocks is not limited. Therefore, there may be situations in which an application does not have enough room to display all of the current context blocks. This is referred to as an "overflow case". The overflow case occurs when there is not enough vertical room in the context UI container 502 to display all of the context blocks. One solution of the overflow case, in this particular example, is as follows: When an overflow occurs, the application can display a small scroll button at the bottom of the context block container. This button serves as an indicator that there are one or more context blocks scrolled out of the container. Clicking on the button once scrolls down by a predetermined number of pixels, e.g. 44 pixels, or to the end of the last context block, whichever is less. This, in turn, causes part or all of some context block to scroll off of the top of the context UI container 502. Accordingly, the context UI container 502 will also show a scroll button at its top when this occurs. Clicking on this top button will scroll up by a predetermined number of pixels, e.g. 44 pixels, or to the top of the first context block, whichever is less.

If there are no more context blocks or parts of context blocks scrolled out of the container in a certain direction (either up or down), then the corresponding respective scroll button will disappear. Since the scroll buttons take up space in the container 502, the calculation for when the scroll buttons should disappear takes into account the additional room that would appear if the button were not there.

Application Window Resizing Issues and the Context UI Container

The context UI container 502 is defined in the illustrated example to have a standard size horizontally and is sized to fit the application window vertically. The context UI container 502 responds to window/resolution resizing issues as follows: Vertically, the container resizes to fit into the space left over in the application frame from any other UI areas at its top or bottom. If the vertical space is not enough to hold all context blocks, then the overflow mechanism described above is invoked. Horizontally, the context UI container does not resize except to accommodate larger context blocks or context panes. Other than this case, the container only expands or collapses completely. The container does not resize horizontally due to the application window resizing. If the user resizes the window horizontally so that the window is narrower than the context UI container, the container will be clipped.

Context Blocks

In the illustrated example, context blocks are rectangular control containers that expose top-level commands for a given context. A context is anything that can be described by an "expression" in the application. Examples of expressions are given below. Typical contexts include: the type of document being currently viewed, the state that the document is currently in, for example, whether the document is in read-only (or browse) mode or is editable, and any objects that are currently selected in the document. Other contexts were listed above. Context blocks appear and disappear based on whether an expression that describes their context is true or false, respectively. This is discussed in more detail in the "Expression Evaluation" section below.

FIG. 6 shows exemplary context block 508*b* apart from the context UI container 502 of FIG. 5. Context block 508*b* displays text formatting commands. Each block comprises a title bar area 600 and a controls area 602.

The title bar area 600 provides a location to label the entire context block, provides expand/collapse functionality, and also contains a button 604 that opens up the context block menu. The user can click anywhere on the title bar outside of the menu button to toggle the expansion state of the context block. On the right-hand side of the title bar area 600, button 604 can be clicked to bring up a menu that can contain links to context panes, as well as commands that execute immediately without invoking a context pane. The menu then closes after the user invokes a command from it.

The controls area 602 is the main area of the context block and exposes commands to the user. In the illustrated example, the controls area allows any arbitrary HTML code to be filled into it, so commands can be exposed in any way that HTML supports. Of course, other manners of defining commands other than HTML can be used. Context blocks are advantageously "modeless" meaning that any action taken by the user is immediately applied to the user's selection in the document. This is advantageous over past methods because a user can experiment with different selections that are available through the context block and see their choices immediately effectuated in their document. In some cases, this eliminates the need for a costly (in terms of both space and time) "preview pane." This does not, however, mean that the context blocks must always be modeless. For example, a context block for inserting a table could be provided where the user sets the number of rows and columns before pressing an "insert" button.

One feature of context blocks that prevents them from being inadvertently displayed is that a selection that is made by the user in a particular document (e.g. with their cursor) must contain only content that is pertinent to a particular set of displayable commands. If the user's selection includes an object but also additional content around the object, then the context block for that object will not be displayed. So for example, in order to have a table formatting context block visible, the user's selection would need to contain only the table, or the user's insertion point (i.e. cursor) would have to be in the table.

Context Panes

In the described embodiment, context panes, like context blocks, are also rectangular controls containers. One primary difference in this implementation is that context panes are typically larger than context blocks and only one context pane can be viewed at one time. It will be appreciated, however, that this is simply a choice for this particular implementation.

Context panes are used to expose secondary commands as well as task-based UIs, such as stepping through document publishing merge conflicts, in the application. Context panes can also be used to display various error messages related to the current document, such as when there are versioning problems when publishing a document and the user needs to make a decision about which version to keep. To maintain consistency, commands that are contained in context blocks are also repeated in their associated context panes.

Context panes can be accessed from the menus of their associated context blocks, through keyboard shortcuts, or from other UIs in the application, such as from a global toolbar. In the described embodiment, when a context pane: is invoked, the entire content of the context UI container 502 (FIG. 5) is replaced with the context pane. Advantageously, context panes are typically modeless with respect to the document. This means that the user can continue to interact with their document while a context pane is open. For example, if a user wishes to use a strikethrough command repeatedly in a portion of text, the user can do this time after time by simply selecting the appropriate text and clicking on a strikethrough box in the context pane. In the past, a user would have had to traverse a menu structure for each separate invocation of the strikethrough command.

FIG. 7 shows an exemplary context pane 700 that includes secondary format font commands. Context pane 700 includes a title bar 702 and a controls area 704 that contains individual commands. A context pane looks similar to a context block that fills up the entire context UI container. There are, however, a few differences in the described example. Here, context panes are not collapsible. That is, they are displayed in their entirety for a user during the course of a user's interaction with them. In addition, context panes have a standard way to be closed, e.g. a "Close" button or the equivalent at the bottom of the panel can be clicked on by the user.

In addition, whereas a user does not have to request a context block in order for it to appear, a user does, in most cases, request a context pane for it to appear. That is, context panes are not automatically displayed as a result of an expression evaluation. Rather, they are displayed based on some event or function call. There can be, however, some context panes that are expression based and are not end-user initiated (e.g. an error context pane that informs a user of an error condition). In addition, in this example, the user must also physically dismiss a context pane when it is no longer needed. That is, the context pane will not automatically disappear. Thus, the user is free to move their selection around the document while interacting with a context pane. If the context pane's functionality is context sensitive (for instance if it contains tools that only apply to a table within the document), then the controls in the context pane become disabled if they are out of context. The context pane typically does not disappear or collapse, in many instances, when it goes out of context.

User Assistance in Context Panes

Context panes are used to provide access to the full range of commands in an application. In this way, context panes complement context blocks. There may be instances where a user may not be familiar with all of the commands that are displayed in the context pane. Accordingly, in the described embodiment, the context panes provide context-sensitive access to help for their commands via a pop-out help pane. This help pane appears to the right of the context pane and causes the context UI container to grow horizontally. This pushes the user's document somewhat to the right. The help pane provides quick, contextual help on how to use the controls on the pane or context block. In the FIG. 7 example, the help pane is accessed by a help icon 706 ("?") on the right side of the context pane's title bar 702.

This is much different from current help features in most current application programs. Presently in many applications, a user will have to either search through a help menu to find particular topics of interest, or they may have to enter a search query through a dialog box that typically pulls up multiple topics that relate to their search. They must then navigate through the different multiple topics to find the one in which they are interested. "Help" in these instances, is typically delivered as a separate application, overlaying, obscuring, or displaying outside of the user's application window. There is no awareness of the context of the user's work. Here, however, the described approach is somewhat different. First, the help function is contextually related to the current context pane. Thus, the user only receives help information that is pertinent to their current context. Additionally, because the help information is specifically tailored to the user's current context, and because there is a dedicated space for the context blocks and context panes, more thorough help information can be displayed in the container UI than would normally be possible in present systems. In addition, the help feature is rendered in a "modeless" fashion so that the user can continue working in their document while the help menu is displayed. Further, it is worth noting that the contextual help provided by the present example is tailored not only to the user's context, but to the tasks and troubleshooting steps that are most likely to be needed by the user in that context. For instance, if the user is correcting a misspelled word in the document by using a context pane designed for that purpose, the help pane associated with that context pane may contain information about how to correct the misspelled word with one of the provided choices, how to add the word in question to the system dictionary, and how to replace the word in question with a different word altogether. Accordingly, the user is provided with assistance in a much more efficient and informative way.

Stackability

Although only one context pane can be viewed at a time, it is possible for multiple panes to be stored in a stack. In this case, closing one context pane reveals the next context pane in the stack. There are a number of cases where context panes can get stacked on top of each other. The following constitute some exemplary cases:

- A context pane is open and then an error context pane is displayed
- A context pane is open and the user then opens up another context pane from a button on the global toolbar.
- A context pane has a button that opens another context pane.
- A context pane is open and the user hits an accelerator key that opens up another context pane In each case above, the latter context pane opened goes to the top of the stack, while the previous context pane goes underneath it on the stack.

In addition, each document can have its own stack of context panes. If the user navigates away from a document and back to it, the document's stack of context panes persists and is redisplayed (though it is possible for members of a stack to be aged out).

Expression Evaluation

As described above, context blocks are automatically presented to the user depending on the user's current context. In the described embodiment, an expression-based method is used to ascertain which contexts blocks to present and when to present them.

One way of implementing an expression-based method is as follows. Each context block is associated with an expression that can evaluate to a predetermined value. Each expression is essentially a defined condition that describes some aspect of a user's interaction with a document. As a user interacts with a document, the expressions, or at least portions of the expressions, are evaluated to ascertain whether they evaluate to the predetermined value. When one or more of the expressions evaluates to the predetermined value, the context block that is associated with that expression is displayed for the user.

FIG. 8 is a flow diagram that describes steps in a method in accordance with the described embodiment. The described method can be implemented in any suitable hardware, software, firmware or combination thereof. In the illustrated example, the method is implemented in software.

Step 800 associates a context-sensitive UI with a visibility expression. An exemplary context-sensitive UI is a context block as described above. In the described example, a table is used for the association and includes two columns, one of which is associated with a particular context block, the other of which is associated with the context-block's visibility expression. FIG. 9 shows an exemplary table 900 with columns 902 and 904. Column 902 contains entries associated with each context block, while column 904 contains so-called visibility expressions that are associated with each of the context blocks. In the illustrated example, two exemplary context blocks are shown in column 902 with their corresponding visibility expressions in column 904. For example, for the "Font Format" context block the visibility expression is "em & ts". The visibility expression is a Boolean expression that describes a condition in which the application is in "edit mode" (i.e. "em") with a portion of text having been selected (i.e. "ts"). For the "Table Commands" context block, the visibility expression is "em & ip=t+tbs" which translates to a condition in which the application is in edit mode and an insertion point lies within a table (i.e. "ip=t"), or a table has been selected (i.e. "tbs").

Step 802 determines whether a visibility expression has changed in value because of a user's action. A user's action can typically change their context. A user's context could be based upon any type of variable such as user selection, insertion point, time of day, user's name, to name just a few. If the value of a visibility expression has changed, then step 804 removes visible UIs (i.e. context blocks) that are not applicable to the current context. Step 806 displays UIs that previously were not visible but are applicable to the user's current context.

Figure 10:
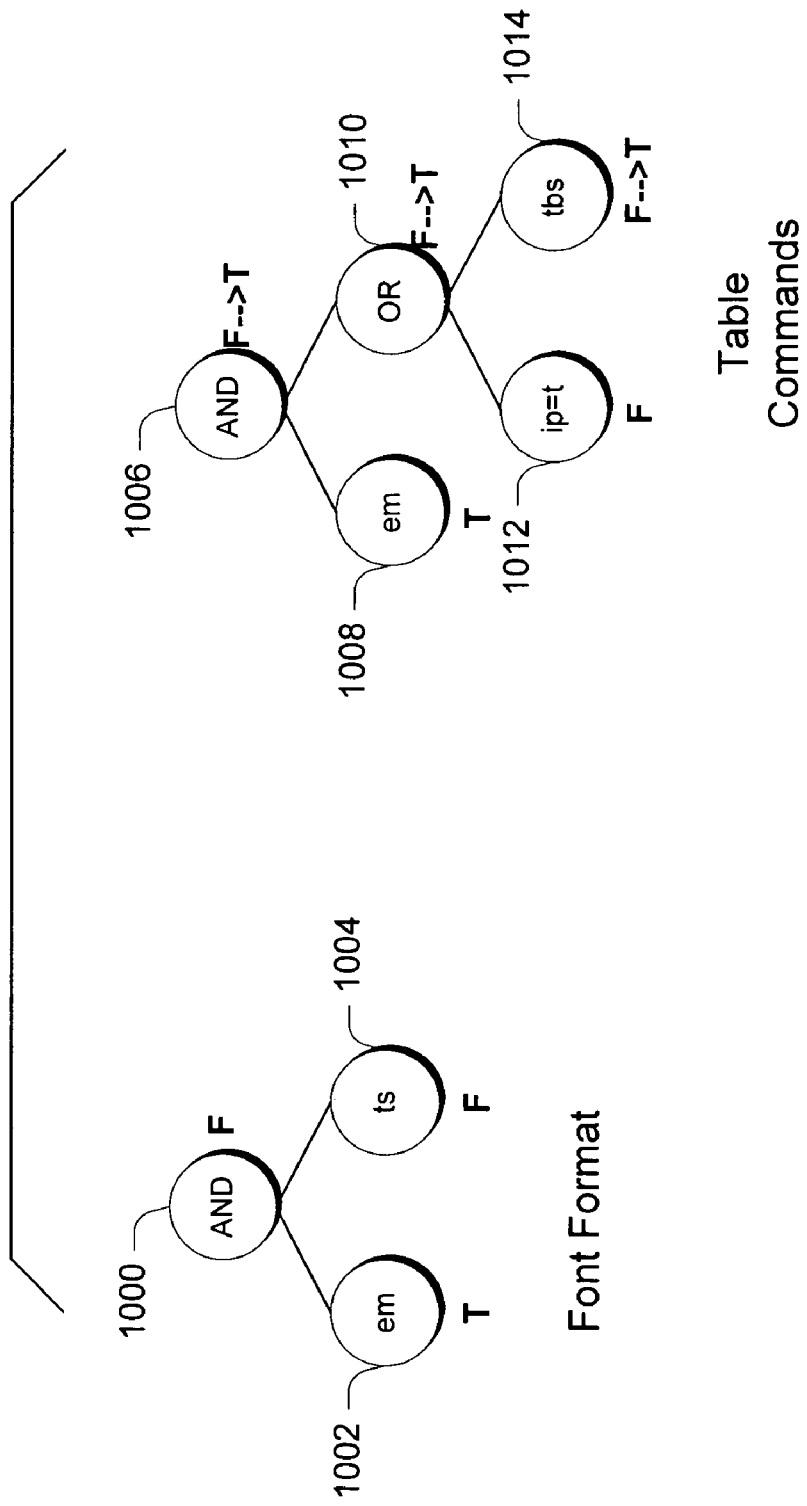
FIG. 10 is a diagram of a tree structure in accordance with one described embodiment.

The visibility expressions can be evaluated in any suitable fashion. For example, each time the user takes an action within a document, all of the expressions in table 900 can be evaluated. A more desirable approach is as follows:

Each of the expressions is represented in a data structure known as a "tree". FIG. 10 shows exemplary tree structures for the two illustrated visibility expressions of FIG. 9. Here, the top node of each tree comprises an operation. In the present case, the operation happens to be an "AND" operation for each expression. Each top node has one or more children nodes that can either be operands or operations. In the case of the font format context block expression, each of the children nodes 1002, 1004 is an operand (i.e. "edit mode" and "text selected" respectively). For the table commands context block expression, child node 1008 is an operand (i.e. "edit mode") and child node 1010 is an operation (i.e. an "OR" operation). In turn, node 1010 has two operand nodes 1012, 1014 (i.e. "insertion point=table", and "table selected" respectively).

Each tree structure can evaluate to either "TRUE" or "FALSE". If the tree structure evaluates to "TRUE", then its corresponding context block is displayed. If the tree structure evaluates to "FALSE", or remains in a false state after some of the nodes have been evaluated, the context block is not displayed. The expression value of a tree, however, cannot change unless the value of its operands changes. For example, consider the font format tree structure. Assume that its current value is "FALSE" (indicated by the "F" adjacent node 1000). Assume also that its edit mode operand 1002 has a value of "TRUE" and its text selected operand 1004 has a value of "FALSE". In this case, the user is currently in edit mode but has not selected any text. In order for this tree structure to change in value, the value of its text selected operand 1004 must change from "FALSE" to "TRUE". This will only happen when a user has selected some text with their cursor. In accordance with the described embodiment, when the value of a child node changes, it generates a notification to its parent node that its value has changed. The parent node expression is then re-evaluated to ascertain whether its value has changed. If its value has changed, then if it has a parent node, it generates a notification that is sent to its parent node. This continues until either a parent node's expression does not change in value, or the top parent node's expression changes in value. If the latter is the case, a corresponding context block is either displayed or removed. If the former is the case, then a current state is maintained (i.e. if the context block was previously displayed, then it is still displayed; and if the context block was not previously displayed, then it is not displayed). Thus, in many cases, only a portion of the visibility expression will need to be evaluated.

As another example, consider the visibility expression for the table commands context block. Assume that the current state of the expression is as indicated in the table below:

| Node | Value |
| --- | --- |
| AND | FALSE |
| Em | TRUE |
| OR | FALSE |
| ip = t | FALSE |
| tab sel | FALSE |

In this example, the table commands context block is not being displayed because the top node 1006 has evaluated to "FALSE". The user is in edit mode and neither the insertion point is in a table nor has a table been selected. Assume now that the user selects a table with their cursor. In this case, the value associated with node 1014 is changed to "TRUE". Because this node changed in value, it generates a notification and sends the notification to its parent node 1010. Node 1010 is an OR expression whose value now re-evaluates to "TRUE". Because this node has changed in value, it generates a notification and sends the notification to its parent node 1006. Node 1006 is an AND expression that now evaluates to "TRUE". Since this is the top node and it now evaluates to "TRUE", the context block with which it is associated is now displayed for the user. This logically follows from the user's actions. That is, in order to change the value of node 1014, the user had to select a table. When the user selects the table, the table commands context block should automatically be displayed for the user. If and when the user "unselects" the table, the value associated with node 1014 will change and this change will be propagated up the tree in the form of notifications until the top node 1006 is re-evaluated to "FALSE" and the context block is removed.

Figure 11:
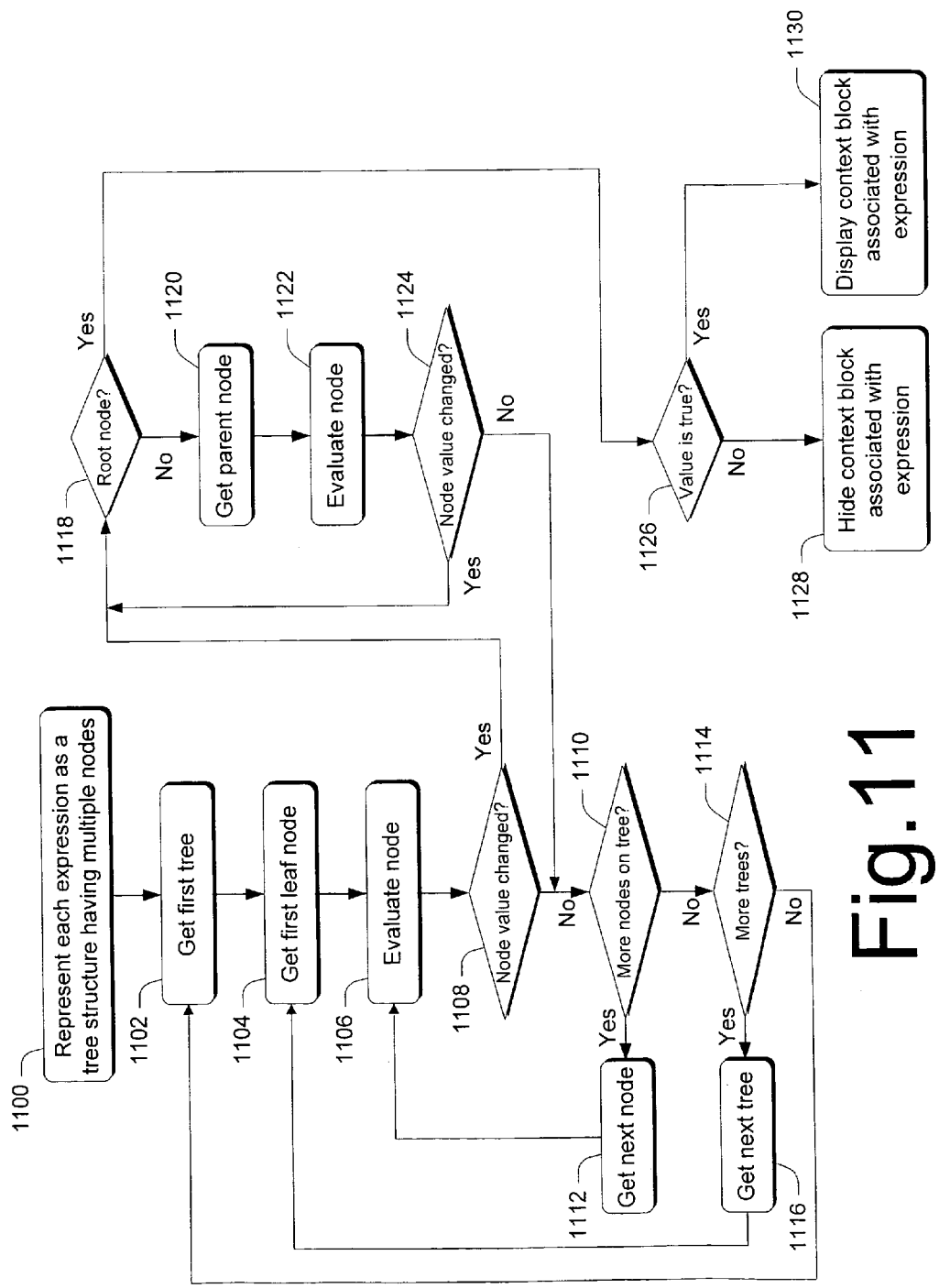
FIG. 11 is a flow diagram that describes steps in a method in accordance with one described embodiment.

FIG. 11 is a flow diagram that describes steps in an exemplary expression-evaluation method in accordance with the above-described embodiment. The described method can be implemented in any suitable hardware, software, firmware, or combination thereof. In the illustrated example, the method is implemented in software.

Step 1100 represents each expression as a tree structure having multiple nodes. Exemplary expressions and tree structures are shown and described in connection with FIGS. 9 and 10. Step 1102 gets the first tree or tree structure and step 1104 gets the first leaf node on the tree. In the FIG. 10 example, exemplary leaf nodes are shown at 1002, 1004 for the font format tree, and 1008, 1012, and 1014 for the table commands tree. Step 1106 evaluates the node. Step 1108 determines whether the node value has changed. If the node value has not changed, then step 1110 determines whether there are more nodes on the tree, and if so, step 1112 gets the next node and returns to step 1106. If there are no more nodes on the tree, step 1114 determines whether there are more trees. If there are additional trees, step 1116 gets the next tree and returns to step 1104 to evaluate the nodes of the tree. If there are no additional trees, then step 1114 returns to step 1102. Note, that the return of step 1114 can take place automatically to repeat the above process, or the return can be effected by a user's context change.

If, at step 1108, the node value has changed, step 1118 determines whether this node is the root node of the tree. If the node is the root node, then the method branches to step 1126 to ascertain whether the value of the node is "TRUE" or "FALSE". If the value is "FALSE, then step 1128 hides the context block that is associated with that particular visibility expression. If, on the other hand, the value is "TRUE", then step 1130 displays the context block that is associated with that particular visibility expression. If, at step 1118, the node is not the root node, step 1120 gets the parent node of that particular node and step 1122 evaluates the parent node. If the node value changes (step 1124), then the method branches back to step 1118. If, on the other hand, the node value does not change, then the method branches to step 1110.

The above-described process is advantageous in that many times the complete expressions that are associated with the context blocks need not be evaluated. Many times, only portions of the expressions need to be evaluated. If a particular portion of the expression has changed in value, then additional portions of the expression can be evaluated. If particular portions of the expression have not changed in value, then it is possible to terminate the expression-evaluation process thereby saving processing overhead.

Note that a small delay function can be built into the system so that the expression evaluation process is not initiated immediately when a user takes a particular action. For example, the system might be programmed so that the expression evaluation process is not initiated until a user has left their cursor in a particular location for a definable amount of time. Such delay mechanisms will be understood by those of skill in the art and are not discussed in detail any further.

Single Navigable Window Application

In accordance with one implementation, the context-sensitive context blocks and context panes can be employed in connection with a single application program having multiple different functionalities to which a user can navigate and accomplish multiple different tasks. As the user navigates to the different functionalities, their context inevitably changes. As their context changes, so too do the context blocks and context panes that are displayed for the user. An exemplary single application program with multiple different functionalities is described in the U.S. Patent Application entitled "Single Window Navigation Methods and Systems", incorporated by reference above.

In the exemplary single application program that is subject of the reference incorporated above, software provides a user interface (UI) that presents a user with a single navigable window that can be navigated from functionality to functionality by a user. The individual functionalities are desirably provided by a single application program the result of which is a highly integrated software product.

A user, through the use of various navigation instrumentalities can navigate between the functionalities and when doing so, the single window ensures that only one functionality is presented to a user at a time. In this described embodiment, one navigation instrumentality is provided in the form of a web browser-like navigation tool. The choice of a web browser-like navigation tool follows from concerns that navigation instrumentalities be of a type that is readily understood by most individuals familiar with computing environments. Thus, when a user first encounters the inventive navigable single window concept for the first time, they do not have to learn an unfamiliar navigation concept. Another navigation instrumentality includes links to each of the multiple different functionalities. These links can be clicked on by a user and the single navigable window is automatically navigated to the selected functionality.

Figure 12:
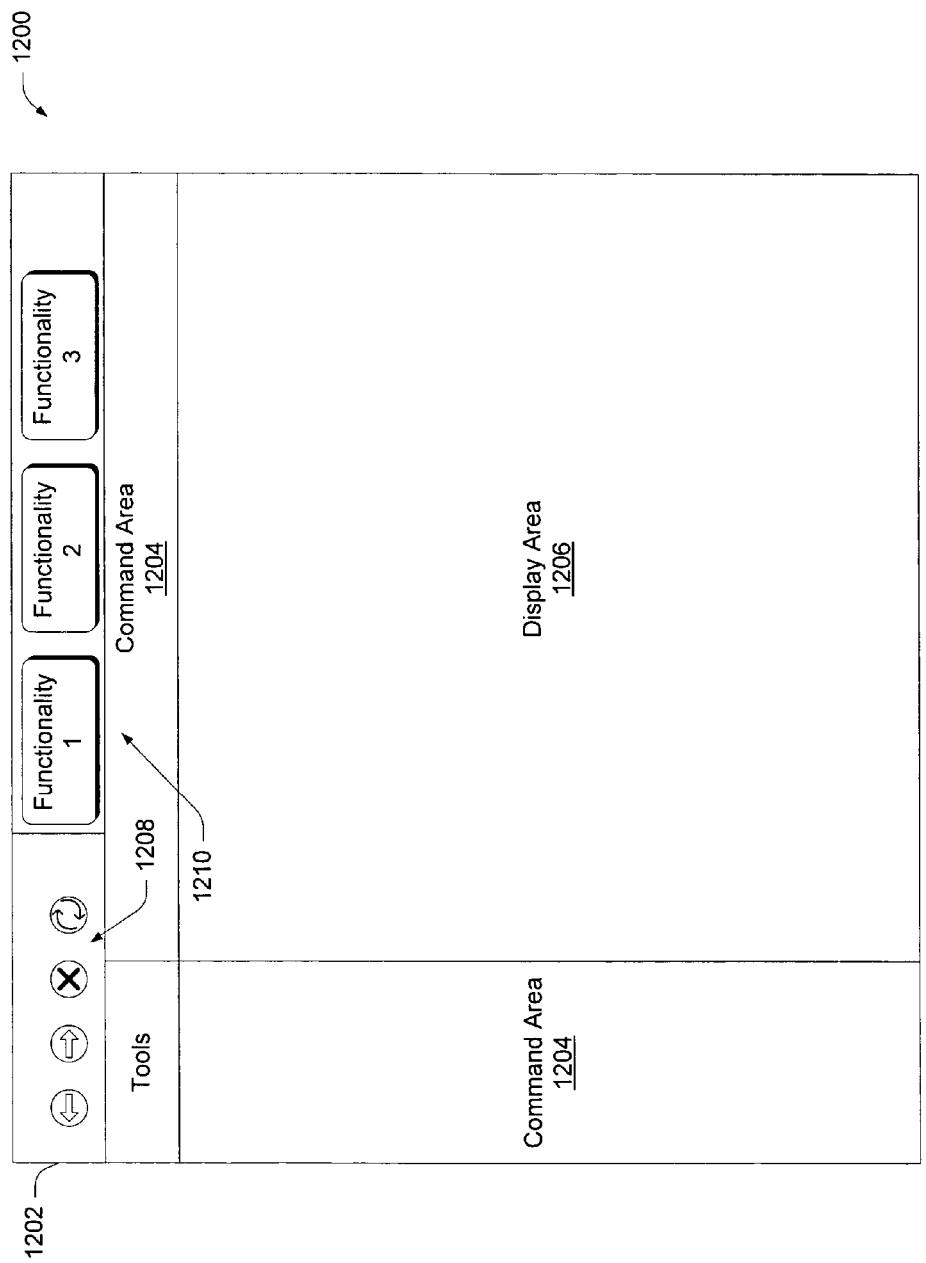
FIG. 12 is a diagram of a user interface in accordance with one described embodiment.

FIG. 12 shows but one exemplary user interface (UI) 1200 in accordance with one described embodiment. It will be appreciated that other UIs could be used to implement the inventive concepts described herein and that the illustrated UI constitutes but one way of doing so. In the illustrated example, UI 1200 includes a navigation bar 1202, one or more command areas 1204, and a display or document area 1206 that constitutes the single navigable window.

Navigation bar 1202 is located adjacent the top of display area 1206 and contains browser-like navigation buttons 1208 in the form of a "back" button, a "forward" button, a "stop" button and the like. The navigation bar can be located anywhere on the UI. Its illustrated placement, however, is similar in appearance to the placement of traditional web browsing navigation features. In addition to the navigation buttons 1208, the navigation bar 1202 also includes links 1210 to the different functionalities that can be accessed by the user. In the illustrated example, links to three exemplary functionalities (i.e. functionality 1, functionality 2, and functionality 3) are shown. These functionalities are typically different functionalities that can enable a user to complete different respective tasks. Examples of different tasks are given below in more detail. These functionalities are all provided within the context of a single application. To access a particular functionality, a user simply clicks on one of the links and a window that pertains to the selected functionality is immediately presented in the display area 1206.

Command areas 1204 are located adjacent the top and left side of the display area 1206. The command area(s) can, however, be located in any suitable location. The command areas provide commands that are both global in nature and specific to the particular context the user has selected. For example, some commands such as "search" and "help" might be considered as global in nature since they can find use in many contexts. Other commands, such as "text bold" or "reply to all" are more specific to the particular context that the user has selected. For the "text bold" command, the user's context may likely be a word processing context, while the "reply to all" command may likely be employed in an email context.

Example

Figure 13:
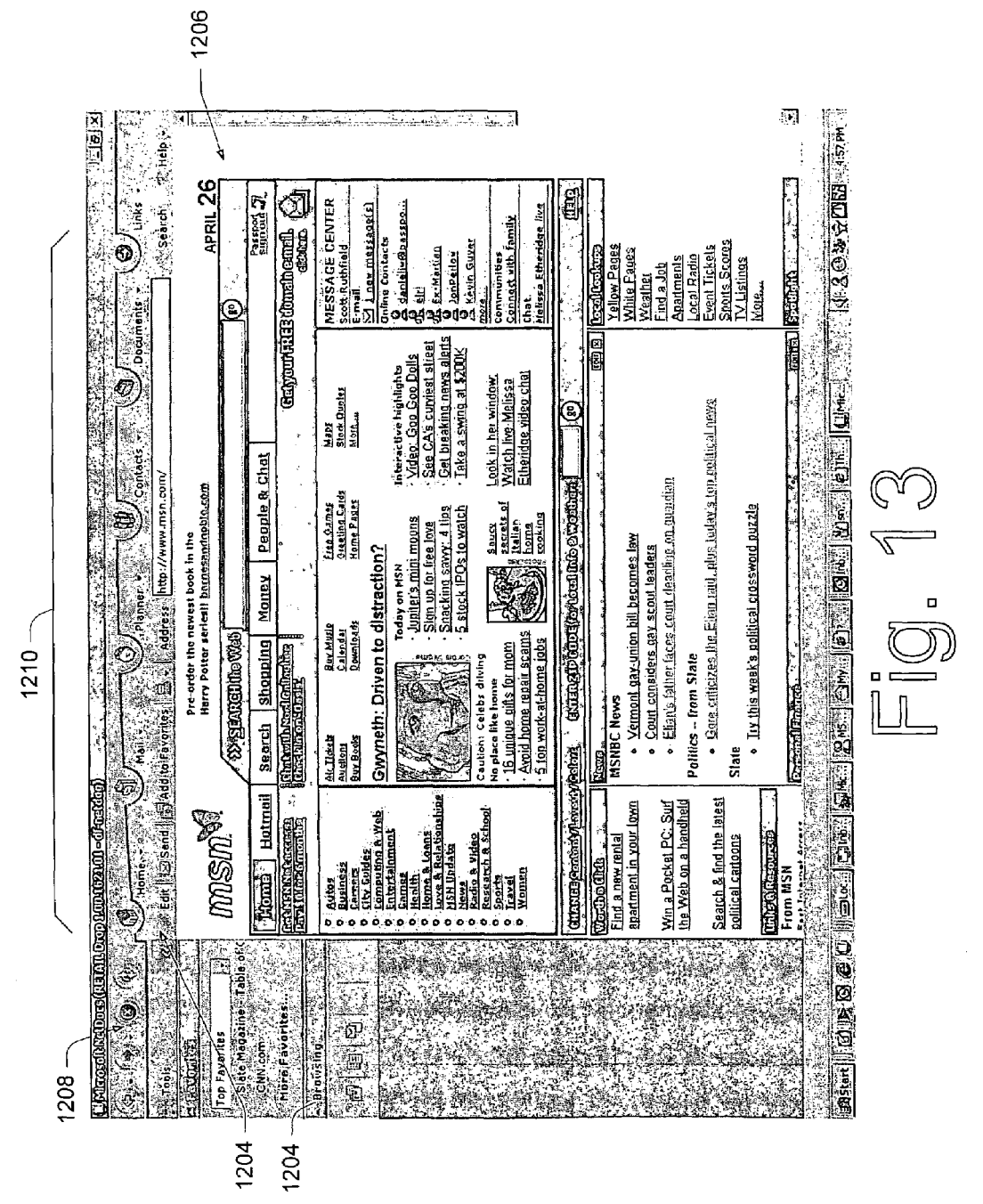
Figure 14:
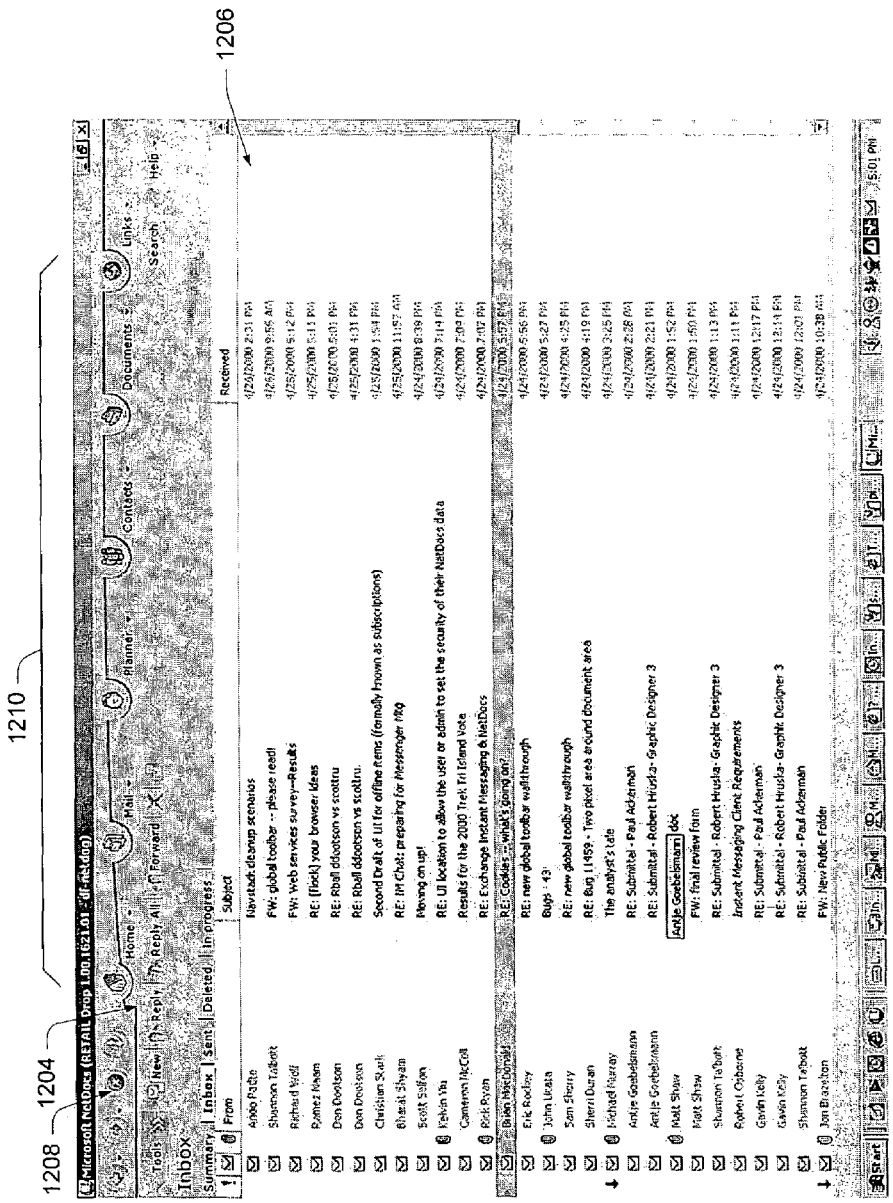
FIG. 14 is a diagram of a user interface in accordance with one described embodiment that illustrates an exemplary functionality.

As an example of the single navigable window provided by a single application consider FIGS. 13 and 14.

In this example, the multiple functionalities 1210 that can be navigated by a user include a browser functionality (indicated by the home icon), a mail functionality (indicated by the letter icon), a planner functionality (indicated by the clock icon), a contacts functionality (indicated by the people icon), a documents functionality (indicated by the folder icon), and a links functionality (indicated by the world icon). These functionalities are so-called "document-centric" functionalities because they all relate in some way to a document that a user interacts with, e.g. a Web page document, an email document, a calendar document, etc.

FIG. 13 shows an example of a display that is rendered in the display area 1206 when a user clicks on the link to the browser functionality. By clicking on the link (i.e. the home icon) to the browser functionality, single application program software executing on the user's computer executes to implement a browser functionality. In this example, the browser functionality displays the user's home page in display area 1206. Notice also that navigation buttons 1208 are provided for navigation between the different selectable functionalities. The command areas 1204 contain context blocks designated as "Favorites" and "Browsing" that include command sets with commands that are specific to the context that the user has selected. In this example, the user's context is a browsing context. Accordingly, the leftmost command area contains commands that are specific to the browsing functionality. Such commands include ones that a user would normally expect to find in a web browser. Notice also that the command area 1204 adjacent the top of display area 1206 also contains commands that are specific to the browsing context, i.e. "Add to Favorites" and an address well in which the user can type a URL of a particular destination web site. Thus, context blocks that are displayable in the leftmost command area are automatically presented to the user as the user's context changes.

FIG. 14 shows an example of a display that is rendered in the display area 1206 when the user clicks on the link to the mail functionality (i.e. the folder icon). By clicking on this link, single application program software executing on the user's computer executes to implement the mail functionality. In this example, the mail functionality displays a user's inbox with messages that have been received by the user. Notice that the leftmost command area has been minimized by the user and that command area 1204 adjacent the top of the display area 1206 contains commands that are specific to the user's current context, e.g. "New" for generating a new email message, "Reply" for replying to an email message, "Reply to All" for replying to all recipients of an email message and the like. When the user's context within this functionality changes in a way that requires one or more context blocks to be displayed, the context blocks will be automatically displayed in the leftmost command area. For example, a user may author an email message and desire to italicize a portion of text. Upon selecting a portion of text, a text formatting context block will automatically appear for the user to use. As another example, assume that a user incorporates a table into their email message, if they then move the cursor inside of the table, the table formatting context block will automatically appear in the leftmost command area.

Although not specifically illustrated, the user could have displays for the planner, contacts, documents, and links functionalities presented in the display area 1206 by simply clicking on the links to these specific functionalities. When so displayed, context blocks that are associated with the user's context in these particular functionalities will be automatically displayed in accordance with the user's particular context. The navigation bar 1208 provides the user with the ability to navigate through these different functionalities in a browser-like manner.

It is important to note that the above example constitutes but one exemplary way in which multiple different functionalities and context blocks can be presented to a user within the construct of a navigable structure. It should be understood that the specifically illustrated functionalities (i.e. browser, mail, planner etc.) constitute specific examples of different functionalities that are capable of being incorporated into the single application program that provides the navigable window. Accordingly, other different functionalities can be employed. This aspect is discussed in more detail in the section entitled "Extensible Functionalities" below. It should also be noted that various context panes are associated with the individual context blocks that form the basis of this example. The context panes have not specifically been described in this example because they were explained above.

FIG. 15 is a flow diagram that describes steps in a method in accordance with the described embodiment. The illustrated method can be implemented in any suitable hardware, software, firmware, or combination thereof. In the illustrated example, the method is implemented in software.

Step 1500 provides a single application program with multiple different functionalities. The functionalities, as pointed out above, are advantageously different so as to enable a user to accomplish different tasks. One specific non-limiting example of different functionalities was given above in the context of document-centric functionalities that enable a user to make use of browser, mail, planner, contacts, documents, and links functionalities. Step 1500 can be implemented by configuring a computing device, such as a user's computer, with the single application program having the multiple different functionalities. This step can also be implemented by providing a software platform in the form of a generic single application shell that is extensible and adaptable to receive different extensions or software modules that embody various different functionalities, as described in various patent applications incorporated by reference above. These different extensions are then presented to the user in the context of the single application having the multiple different functionalities.

These extensions can be delivered to the platform in any suitable way and through any suitable delivery mechanism. For example, one way of delivering the various extensions or functionalities is to deliver them via a network such as an Intranet or the Internet. Regardless of the manner in which the single application is provided, step 1502 presents a user interface (UI) with a single window and links to the multiple different functionalities. The UI can also advantageously include navigation instrumentalities that enable a user to navigate between the different functionalities in a browser-like manner. FIGS. 13-14 give specific examples of an exemplary UI that can be used in accordance with the described embodiment. Step 1504 ascertains whether a user has selected a particular link to a functionality or whether the user has used one of the navigation instrumentalities to navigate to a particular functionality. If a user has not done either, the method branches back to step 1502. If, on the other hand, a user has selected a particular link or used a navigation tool to navigate to a particular functionality, step 1506 presents a functionality-specific display within the single window. That is, the single navigable window is navigated by the software to the selected functionality. Specific examples of this were given above in connection with FIGS. 13 and 14 in which browsing and mail functionalities were respectively displayed within display area 1206. In connection with presenting the functionality-specific display in step 1506, step 1508 can present functionality-specific commands in a command area of the UI. This is advantageously done automatically as a user navigates from functionality to functionality. That is, as a user changes functionalities, command sets that are specific to the user's current context or functionality are automatically displayed in the command area. In connection with this step, context blocks can be automatically displayed as described above. It will also be appreciated that step 1508 includes the step of presenting various context panes in response to the user selecting them as described above. Step 1508 then branches back to step 1504 to ascertain whether the user has navigated to another functionality.

Context Block and Context Pane Persistence

In the multi-functionality application scenario, context blocks or context panes can be provided that are not specifically associated with a specific document. Rather, these context blocks and context panes remain open regardless of the document, until the user explicitly closes them. Such context blocks and panes are referred to herein as "Application-level context blocks" and "Application-level context panes".

Application-Level Context Blocks and Application-Level Context Panes

Application-level context blocks are context blocks that are not removed from the UI, even when the user navigates to another document. So, instead of being associated with a particular document, they are associated with a state of the application as a whole. Application-level context panes are similar: they are context panes that stay open even when the user navigates to another document.

As an example, consider a user that desires to use a "search" function. If the user opens the search function, a context pane corresponding to the search function will populate the context UI container. The search context pane is specific to the user's particular functionality. Thus, if the user has navigated to their email inbox, the search context pane will enable them to search their inbox. If the user has navigated to a particular document, the search context pane will enable them to search that document. As long as the search context pane is not closed by the user it will navigate with them from functionality to functionality and enable them to specifically conduct searches with the individual functionalities.

Application-Level Context Panes and Stacking

Application-level context panes are implemented with special behavioral characteristics with regards to the stacking of context panes. In this example, there are two types of context panes: those with affinity to a particular document, and those with no affinity to any document. A stack of context panes that have been opened is maintained. The stack is ordered so that the most recent pane is on the top of the stack. This stack does not contain any panes that have been explicitly closed by the user. The first pane in the stack that meets one of the following two criteria is displayed: (1) the pane has affinity to the current document, and (2) the pane has no affinity to any document. If no pane in the stack meets these criteria, then the context blocks are displayed. Note that this has the effect of hiding any pane that does not have affinity to the current document. This means that when navigation occurs, panes with affinity to the previous document are suppressed. Panes with affinity to the new document and those with no affinity to any document become candidates for display. They are considered as candidates because only the pane closest to the top of the stack is actually displayed.

CONCLUSION

The embodiments described above provide methods and systems that automatically present a user with commands that are specific to a task in which the user happens to be engaged. Advantageously, as the user's context changes within an application, the commands that are presented automatically change as well. In various implementations, the user can be given the opportunity to select additional context-sensitive commands for display. Overall, the methods and systems advantageously enable a user to take advantage of many different commands without requiring the user to know much about the application that they are using. In one particular implementation, a single application comprises multiple functionalities that enable a user to accomplish different tasks. These multiple functionalities are presented in the context of a single window that is navigable by a user between the different functionalities. Advantageously, navigation instrumentalities are provided that are, in some instances, browser-like in appearance and allow the user to navigate between the application-provided functionalities in a browser-like manner. Functionality-specific commands can be automatically presented to the user when they navigate to a particular functionality. The functionality-specific commands are presented, in the illustrated example, in the form of context blocks and content panes as described above. One aspect of the single navigable window application is that the application can serve as a basis for an extensible platform that can be configured with different functionalities. Software modules incorporating the different functionalities, as well as appropriate command sets that are displayable in the context blocks and panes, can be desirably included in the software modules.

When the modules are plugged into the platform, a set of extensible functions is provided. Each of the extensible functions can have their own set of unique context blocks and panes that can be automatically displayed in a manner that is defined by the software developer of the module.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method of exposing commands in a software application program, the computer-implemented method comprising:
   causing, by a computer, a display device to display a user interface of the software application program, the user interface simultaneously comprising:
      a document area in which a user works on a document provided by the software application program; and
      a container area proximate the document area, the container area not obscuring the document area;
   while the display device is displaying the user interface, determining, by the computer based on actions of the user within the document area, whether context blocks are relevant to a task that the user is currently performing on the document by evaluating visibility expressions, each of the visibility expressions associated with a different one of the context blocks, each of the context blocks being a separate block containing a different plurality of user-selectable commands associated with tasks that the user is able to perform on the document, each of the context blocks having a different title;
   in response to determining that given ones of the context blocks that are not displayed in the container area are relevant to the task that the user is currently performing on the document and without receiving input from the user, causing, by the computer, the display device to display the user interface such that the container area includes both the titles of the given ones of the context blocks and the commands of the given ones of the context blocks; and
   in response to determining that other ones of the context blocks that are displayed in the container area are not relevant to the task that the user is currently performing on the document and without receiving input from the user, causing, by the computer, the display device to display the user interface such that the container area does not include the titles of the other ones of the context blocks and does not include the commands of the other ones of the context blocks.

2. The computer-implemented method of claim 1, wherein each of the context blocks comprises Hyper-Text Markup Language (HTML) code that specifies the titles and the commands of the context blocks.

3. The computer-implemented method of claim 1, wherein the given ones of the context blocks include at least two of the context blocks.

4. A computer-readable storage medium comprising software code which, when executed by a computer, cause the computer to:
   display a user interface of a software application program, the user interface comprising:
      a document area in which a user works on a document provided by the software application program; and
      a container area proximate the document area, the container area not obscuring the document area;
   in response to an action of the user within the document area, determine whether context blocks are relevant to a task that the user is currently performing on the document by evaluating visibility expressions, each of the visibility expressions associated with a different one of the context blocks, each of the context blocks comprising titles and pluralities of user-selectable commands;
   in response to determining that a given one of the context blocks is not displayed in the container area and that the given one of the context blocks is relevant to the task that the user is performing on the document, display the given one of the context blocks within the container area, wherein when the given one of the context blocks is displayed in the container area, both the title and the plurality of user-selectable commands of the given one of the context blocks are displayed; and
   in response to determining that another one of the context blocks is displayed in the container area and that the other one of the context blocks is not relevant to the task that the user is currently performing on the document, hide the other one of the context blocks.

5. The computer-readable storage medium of claim 4, wherein the given one of the context blocks is within a context pane and the context pane is within the container area.

6. The computer-readable storage medium of claim 5, wherein the context pane must be closed by the user when the user no longer wishes to access commands within the context pane.

7. The computer-readable storage medium of claim 6, wherein a plurality of controls within the given one of the context blocks can be scrolled through by the user.

8. A computer-readable storage medium providing non-volatile storage of computer-readable instructions that, when executed by one or more processors, cause a computer system to:
   display a user interface of a software application program, the user interface comprising:
      a document area in which a user works on a document provided by the software application program; and
      a container area proximate the document area, the container area not obscuring the document area;
   in response to an action of the user within the document area, identify relevant context blocks among a plurality of context blocks by evaluating visibility expressions, each of the visibility expressions associated with a different context block in the plurality of context blocks, the relevant context blocks being relevant to a task that the user is currently performing on the document, each context block in the plurality of context blocks comprising a title and a plurality of user-selectable commands;
   in response to determining that a given one of the relevant context blocks is not displayed in the container area, display the given one of the relevant context blocks within the container area, wherein when the given one of the relevant context blocks is displayed in the container area, both the title and the plurality of user-selectable commands of the given one of the relevant context blocks are displayed; and
   in response to determining that another one of the context blocks is displayed in the container area and that the other one of the context blocks is not relevant to the task that the user is currently performing on the document, hide the other one of the context blocks.

9. The computer-readable storage medium of claim 8, wherein the given one of the relevant context blocks is within a context pane and the context pane is within the container area.

10. The computer-readable storage medium of claim 9, wherein the context pane must be closed by the user when the user no longer wishes to access commands within the context pane.

11. The computer-readable storage medium of claim 8, wherein a plurality of controls within the given one of the relevant context blocks can be scrolled through by the user.

12. The computer-implemented method of claim 8, wherein each context block in the plurality of context blocks comprises Hyper-Text Markup Language (HTML) code that specifies the title and the command of the context block.

* * * * *